United States Patent
Wada et al.

(10) Patent No.: US 11,014,602 B2
(45) Date of Patent: May 25, 2021

(54) POWER CONVERSION DEVICE, MOTOR DRIVE UNIT, ELECTRIC POWER STEERING DEVICE, AND RELAY MODULE

(71) Applicant: NIDEC CORPORATION, Kyoto (JP)

(72) Inventors: Eiji Wada, Kawasaki (JP); Kaori Nabeshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 200 days.

(21) Appl. No.: 16/082,160

(22) PCT Filed: Mar. 1, 2017

(86) PCT No.: PCT/JP2017/008190
§ 371 (c)(1),
(2) Date: Sep. 4, 2018

(87) PCT Pub. No.: WO2017/150639
PCT Pub. Date: Sep. 8, 2017

(65) Prior Publication Data
US 2019/0077449 A1 Mar. 14, 2019

(30) Foreign Application Priority Data

Mar. 4, 2016 (JP) .............................. JP2016-042743
Sep. 30, 2016 (JP) .............................. JP2016-194674

(51) Int. Cl.
*B62D 5/04* (2006.01)
*H02M 7/493* (2007.01)
(Continued)

(52) U.S. Cl.
CPC ............. *B62D 5/0481* (2013.01); *H02K 3/28* (2013.01); *H02M 1/081* (2013.01); *H02M 7/48* (2013.01);
(Continued)

(58) Field of Classification Search
CPC .................................................. B26D 5/0481
(Continued)

(56) References Cited

U.S. PATENT DOCUMENTS 5,142,468 A * 8/1992 Nerem .................... H02M 7/48
363/71
6,005,788 A * 12/1999 Lipo .................... B60L 15/007
363/71
(Continued)

FOREIGN PATENT DOCUMENTS

CN 104753382 A 7/2015
EP 3082232 A1 10/2016
(Continued)

OTHER PUBLICATIONS

JPO Machine Translation of JP-2015116095-A (Apr. 23, 2020).*
International Search Report corresponding to Application No. PCT/JP2017/008190; dated May 23, 2017.

*Primary Examiner* — Jean Paul Cass
(74) *Attorney, Agent, or Firm* — Cantor Colburn LLP

(57) ABSTRACT

A power conversion device may include a first inverter to which a first end of each phase winding of the electric motor is coupled; a second inverter to which a second end of each phase winding is coupled; a first phase isolation relay circuit structured to switch between connection and disconnection of the one end of each phase winding to and from the first inverter; and a first neutral point relay circuit to which the one end of each phase winding is coupled and which is structured to switch between connection and disconnection of the one end of each phase winding to and from the one end of each other phase winding.

6 Claims, 22 Drawing Sheets

(51) Int. Cl.
  *H02P 27/06* (2006.01)
  *H02M 7/48* (2007.01)
  *H02K 3/28* (2006.01)
  *H02M 1/08* (2006.01)
  *H02M 7/5387* (2007.01)

(52) U.S. Cl.
  CPC ......... *H02M 7/493* (2013.01); *H02M 7/5387* (2013.01); *H02P 27/06* (2013.01)

(58) Field of Classification Search
  USPC .......................................................... 701/41
  See application file for complete search history.

(56) References Cited

U.S. PATENT DOCUMENTS

| | | | | |
|---|---|---|---|---|
| 6,021,052 | A * | 2/2000 | Unger | H02J 9/062 363/133 |
| 6,466,466 | B1 * | 10/2002 | Karlsson | H02J 3/26 363/125 |
| 6,608,401 | B1 * | 8/2003 | Walter | H02M 5/458 307/39 |
| 7,142,081 | B1 * | 11/2006 | Shudarek | H01F 27/24 336/178 |
| 7,352,143 | B2 * | 4/2008 | Inaba | H03K 19/018 318/139 |
| 7,432,699 | B2 * | 10/2008 | AF Klercker Alakula | H01F 27/38 324/117 R |
| 7,489,485 | B2 * | 2/2009 | A F Klercker Alakula | H01F 27/38 361/35 |
| 7,570,101 | B1 * | 8/2009 | Short | H03K 17/168 327/432 |
| 8,705,254 | B2 * | 4/2014 | Tan | H02M 1/4216 363/69 |
| 9,285,817 | B2 * | 3/2016 | Wong | H02J 3/1857 |
| 9,425,703 | B2 * | 8/2016 | Luerkens | H02M 3/33592 |
| 2003/0155813 | A1 * | 8/2003 | Walter | H02M 5/458 307/31 |
| 2004/0228094 | A1 * | 11/2004 | Ahmed | H01L 24/49 361/702 |
| 2010/0014325 | A1 * | 1/2010 | Raju | H02M 5/271 363/37 |
| 2010/0085789 | A1 * | 4/2010 | Ulrich | H02M 7/483 363/132 |
| 2011/0199030 | A1 * | 8/2011 | Suzuki | B62D 5/0481 318/400.3 |
| 2012/0098391 | A1 * | 4/2012 | Yamasaki | H02K 11/33 310/68 D |
| 2013/0094266 | A1 | 4/2013 | Balpe | |
| 2013/0106493 | A1 * | 5/2013 | Wu | H03F 3/217 327/427 |
| 2013/0270898 | A1 * | 10/2013 | Bachmaier | B60L 15/2009 307/9.1 |
| 2015/0263526 | A1 * | 9/2015 | Kjær | F03D 9/255 290/44 |
| 2016/0134212 | A1 | 5/2016 | Kikuchi et al. | |
| 2016/0204730 | A1 * | 7/2016 | Suzuki | H02P 29/032 318/139 |
| 2016/0347179 | A1 * | 12/2016 | Bachmaier | B60L 50/62 |
| 2016/0372927 | A1 * | 12/2016 | Dent | H02J 3/381 |
| 2017/0237377 | A1 * | 8/2017 | Furukawa | H02P 29/00 318/564 |
| 2017/0291635 | A1 * | 10/2017 | Yamasaki | H02M 7/003 |
| 2018/0064001 | A1 * | 3/2018 | Ledezma | H02M 5/458 |
| 2018/0093702 | A1 * | 4/2018 | Nampei | B62D 5/049 |
| 2018/0183298 | A1 * | 6/2018 | Severson | H02K 11/33 |
| 2018/0205334 | A1 * | 7/2018 | Dong | H02M 5/458 |
| 2019/0006979 | A1 * | 1/2019 | Suzuki | B62D 5/049 |
| 2019/0097565 | A1 * | 3/2019 | Hayakawa | H02P 25/22 |
| 2019/0276071 | A1 * | 9/2019 | Nagashima | B62D 5/0403 |
| 2019/0291778 | A1 * | 9/2019 | Nagashima | H02P 29/025 |
| 2020/0055542 | A1 * | 2/2020 | Yamamoto | H02P 29/028 |

FOREIGN PATENT DOCUMENTS

| | | | |
|---|---|---|---|
| GB | 2339620 A | * | 12/1998 |
| JP | 2013529055 A | | 7/2013 |
| JP | 5569626 B1 | | 8/2014 |
| JP | 2014192950 A | | 10/2014 |
| JP | 2015033269 A | | 2/2015 |
| JP | 2015116095 A | * | 6/2015 |
| JP | 2015116095 A | | 6/2015 |
| JP | 2016019385 A | | 2/2016 |

* cited by examiner

POWER CONVERSION DEVICE, MOTOR DRIVE UNIT, ELECTRIC POWER STEERING DEVICE, AND RELAY MODULE

CROSS REFERENCE TO RELATED APPLICATIONS

This is the U.S. national stage of application No. PCT/JP2017/008190, filed on Mar. 1, 2017. Priority under 35 U.S.C. § 119(a) and 35 U.S.C. § 365(b) is claimed from Japanese Applications Nos. 2016-042743, filed Mar. 4, 2016 and 2016-194674, filed Sep. 30, 2016; the disclosures of which are incorporated herein by reference.

TECHNICAL FIELD

The present disclosure relates to power conversion devices for converting power from a power supply into power that is to be supplied to an electric motor, motor drive units, electric power steering devices, and relay modules.

BACKGROUND

Electric motors (hereinafter simply referred to as "motors") such as brushless DC motors and AC synchronous motors are typically driven by three phase currents. A complicated control technique, such as vector control, is needed to accurately control the waveforms of the three phase currents. Such a control technique requires complicated mathematical calculation and is therefore performed using a digital computation circuit, such as a microcontroller (microcomputer). The vector control technique is utilized in the fields of applications in which the load on a motor varies significantly, such as washing machines, motorized bicycles, electric scooters, electric power steering devices, electric cars, and industrial equipment. Meanwhile, other motor control techniques, such as pulse width modulation (PWM), are employed for motors that have a relatively low output.

In the field of vehicle-mounted devices, an automotive electronic control unit (ECU) is used in a vehicle. The ECU includes a microcontroller, a power supply, an input/output circuit, an A/D converter, a load drive circuit, and a read only memory (ROM), etc. An electronic control system is constructed using the ECU as a main component. For example, the ECU processes a signal from a sensor to control an actuator, such as a motor. More specifically, the ECU controls an inverter in a power conversion device while monitoring the rotational speed or torque of a motor. The power conversion device converts drive power that is to be supplied to the motor, under the control of the ECU.

A mechanically and electronically integrated motor in which a motor, a power conversion device, and an ECU are integrated together has in recent years been developed. In particular, in the field of vehicle-mounted devices, high quality needs to be ensured for safety. Therefore, a fault-tolerant design is employed in order to allow the motor system to continue a safe operation even if some part of the motor system fails. As an example of such a fault-tolerant design, a single motor may be provided with two power conversion devices. As another example, the ECU may be provided with a backup microcontroller in addition to a main microcontroller.

For example, Patent Document No. 1 describes a power conversion device for converting power that is to be supplied to a three-phase motor, the device including a control unit and two inverters. The two inverters are each coupled to a power supply and a ground (hereinafter referred to as a "GND"). One of the two inverters is coupled to one end of each of the three phase windings of the motor, and the other inverter is coupled to the other end of each of the three phase windings. Each inverter includes a bridge circuit that includes three legs each including a high-side switching element and a low-side switching element. The control unit, when detecting a failure in a switching element in the two inverters, switches the control of the motor from control under normal conditions to control under abnormal conditions. As used herein, the term "abnormal conditions" mainly means that a switching element has failed. The term "control under normal conditions" means control that is performed when all the switching elements are operating normally. The term "control under abnormal conditions" means control that is performed in the event of a failure in a switching element.

In the control under abnormal conditions, a neutral point for the windings is formed by turning on or off switching elements according to a predetermined rule in one of the two inverters that includes a switching element that has failed (hereinafter referred to as a "failed inverter"). According to the rule, for example, in the event of an open-circuit failure in which a high-side switching element is always off, the three high-side switching elements other than the failed switching element are turned off, and the three low-side switching elements are turned on, in the bridge circuit of the failed inverter. In this case, the neutral point is formed on the low side. In the event of a short-circuit failure in which a high-side switching element is always on, the three high-side switching elements other than the failed switching element are turned on, and the three low-side switching elements are turned off, in the bridge circuit of the failed inverter. In this case, the neutral point is formed on the high side. In the power conversion device of Patent Document No. 1, the neutral point for the three phase windings is formed in a failed inverter under abnormal conditions. Even in the event of a failure in a switching element, the motor can continue to be driven using one of the inverters that is operating normally.

CITATION LIST

Patent Literature

Patent Document No. 1: Japanese Laid-Open Patent Publication No. 2014-192950

SUMMARY

In the above conventional technique, there has been demand for further improvement in current control under normal and abnormal conditions.

An embodiment of the present disclosure provides a power conversion device that can perform suitable current control under both normal and abnormal conditions.

An example power conversion device according to the present disclosure for converting power from a power source into power that is to be supplied to an electric motor having n phase windings (n is an integer of three or more), includes a first inverter to which one end of each phase winding of the electric motor is coupled, a second inverter to which the other end of each phase winding is coupled, a first phase isolation relay circuit that switches between connection and disconnection of the one end of each phase winding to and from the first inverter, and a first neutral point relay circuit to which the one end of each phase winding is coupled and which switches between connection and disconnection of the one end of each phase winding to and from the one end of each other phase winding.

Another example power conversion device according to the present disclosure for converting power from a power source into power that is to be supplied to a motor having n phase windings (n is an integer of three or more), includes a first inverter to which one end of each phase winding of the motor is coupled, a second inverter to which the other end of each phase winding is coupled, and at least n relays which switch between connection and disconnection of the one end of each of the n phase windings to and from the first inverter.

According to an embodiment of the present disclosure, provided is a power conversion device that can perform suitable current control under both normal conditions and abnormal conditions using a first phase isolation relay circuit and a first neutral point relay circuit.

In addition, according to an embodiment of the present disclosure, provided is a power conversion device that can perform suitable current control under both normal conditions and abnormal conditions using at least n relays which switch between connection and disconnection of one end of each of n phase windings to and from a first inverter.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Before describing embodiments of the present disclosure, the present inventor's findings that are the basis of the present disclosure will be described.

In the power conversion device of Patent Document No. 1, the two inverters are each always connected to the power supply and the GND. This configuration does not allow the power supply and the failed inverter to be disconnected from each other. The present inventor has found the problem that even when a neutral point is formed in a failed inverter under abnormal conditions, a current flows from the power supply into the failed inverter. As a result, a power loss occurs in the failed inverter.

As with the power supply, a failed inverter cannot be disconnected from the GND. The present inventor has found the problem that even when a neutral point is formed in a failed inverter under abnormal conditions, a current supplied to each phase winding through an inverter that is operating normally is not returned to that source inverter, and flows to the GND through the failed inverter. In other words, a closed loop of a drive current cannot be formed. It is desirable that a current supplied to each phase winding through an inverter that is operating normally should flow to the GND through that source inverter.

Embodiments of a power conversion device, motor drive unit, electric power steering device, and relay module according to the present disclosure will now be described in detail with reference to the accompanying drawings. To avoid unnecessarily obscuring the present disclosure, well-known features may not be described or substantially the same elements may not be redundantly described, for example. This is also for ease of understanding the present disclosure.

Embodiments of the present disclosure are herein described using, as an example, a power conversion device that converts power from a power supply into power that is to be supplied to a three-phase motor having three phase (U-phase, V-phase, and W-phase) windings. Note that the present disclosure encompasses a power conversion device that converts power from a power supply into power that is to be supplied to an n-phase motor having n phase windings (n is an integer of four or more), such as four phase windings or five phase windings.

First Embodiment

Figure 1:
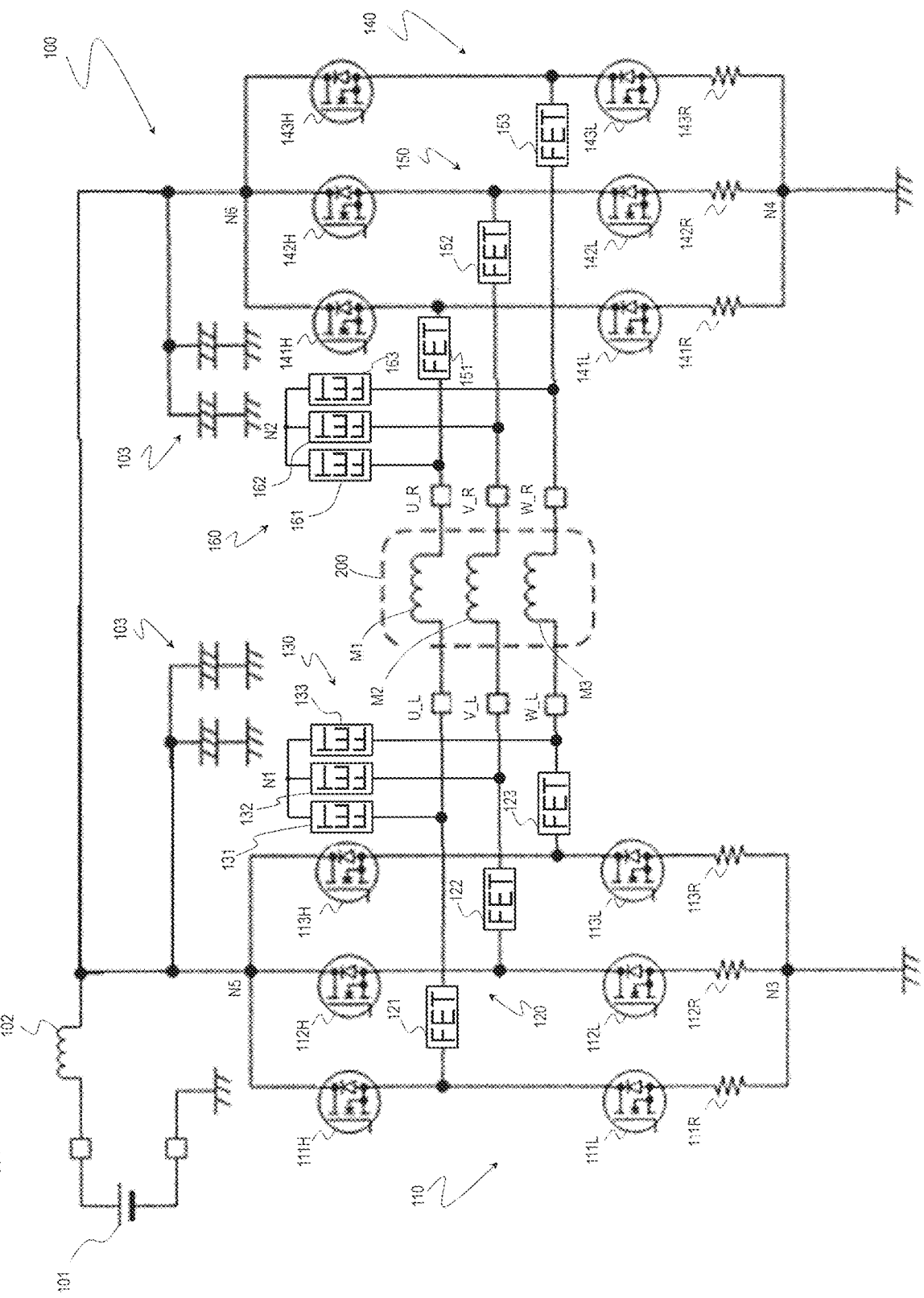
FIG. 1 is a circuit diagram showing a circuit configuration of a power conversion device 100 according to an illustrative first embodiment.

FIG. 1 schematically shows a circuit configuration of a power conversion device 100 according to this embodiment.

The power conversion device 100 includes a first inverter 110, a first phase isolation relay circuit 120, a first neutral point relay circuit 130, a second inverter 140, a second phase isolation relay circuit 150, and a second neutral point relay circuit 160. The power conversion device 100 can convert power from a power supply into power that is to be supplied to various motors. A motor 200 is, for example, a three-phase AC motor. The motor 200 includes a U-phase winding M1, a V-phase winding M2, and a W-phase winding M3, and is coupled to the first inverter 110 and the second inverter 140. More specifically, the first inverter 110 is coupled to one end of each phase winding of the motor 200, and the second inverter 140 is coupled to the other end of each phase winding. As used herein, the terms "couple" and "connect" with respect to parts (components) mainly means an electrical coupling and connection between the parts.

The first inverter 110 has terminals U_L, V_L, and W_L which correspond to the respective phases, and the second inverter 140 has terminals U_R, V_R, and W_R which correspond to the respective phases. The terminal U_L of the first inverter 110 is coupled to one end of the U-phase winding M1, the terminal V_L is coupled to one end of the V-phase winding M2, and the terminal W_L is coupled to one end of the W-phase winding M3. As with the first inverter 110, the terminal U_R of the second inverter 140 is coupled to the other end of the U-phase winding M1, the terminal V_R is coupled to the other end of the V-phase winding M2, and the terminal W_R is coupled to the other end of the W-phase winding M3. Such coupling is different from the so-called star and delta couplings.

The first inverter 110 (may also be referred to as a "bridge circuit L") includes a bridge circuit having three legs. Each leg has a low-side switching element and a high-side switching element. Switching elements 111L, 112L, and 113L shown in FIG. 1 are a low-side switching element, and switching elements 111H, 112H, and 113H shown in FIG. 1 are a high-side switching element. The switching elements may, for example, be a field-effect transistor (typically, a MOSFET) or an insulated-gate bipolar transistor (IGBT). It is, for example, herein assumed that the switching elements of the inverters are a FET, and in the description that follows, the switching elements may also be denoted by FETs. For example, the switching element 111L is denoted by the FET 111L.

The first inverter 110 includes three shunt resistors 111R, 112R, and 113R as a current sensor 170 (see FIG. 4) for detecting currents flowing through the U-phase, V-phase, and W-phase windings, respectively. The current sensor 170 includes a current detection circuit (not shown) for detecting a current flowing through each shunt resistor. For example, the shunt resistors 111R, 112R, and 113R are each coupled between the corresponding one of the three low-side switching elements included in the three legs of the first inverter 110, and the GND. Specifically, the shunt resistor 111R is coupled between the FET 111L and the GND, the shunt resistor 112R is coupled between the FET 112L and the GND, and the shunt resistor 113R is coupled between the FET 113L and the GND. The shunt resistors have a resistance value of, for example, about 0.5-1.0 m$\Omega$.

As with the first inverter 110, the second inverter 140 (may also be referred to as the "bridge circuit R") includes a bridge circuit having three legs. FETs 141L, 142L, and 143L shown in FIG. 1 are a low-side switching element, and FETs 141H, 142H, and 143H shown in FIG. 1 are a high-side switching element. The second inverter 140 also includes three shunt resistors 141R, 142R, and 143R. These shunt resistors are coupled between the three low-side switching elements included in the three legs and the GND. The FETs included in the first and second inverters 110 and 140 may be controlled by, for example, a microcontroller or dedicated driver.

The first phase isolation relay circuit 120 is coupled between one end of each phase winding and the first inverter 110. Specifically, the first phase isolation relay circuit 120 includes three first phase isolation relays 121, 122, and 123 that are each coupled between one end of the respective corresponding phase winding and the first inverter 110. The first phase isolation relay 121 is coupled between a coupling node of the FETs 111H and 111L, and one end of the U-phase winding M1. The first phase isolation relay 122 is coupled between a coupling node of the FETs 112H and 112L, and one end of the V-phase winding M2. The first phase isolation relay 123 is coupled between a coupling node of the FETs 113H and 113L, and one end of the W-phase winding M3. This circuit configuration allows the first phase isolation relay circuit 120 to switch between connection and disconnection of one end of each phase winding to and from the first inverter 110.

The second phase isolation relay circuit 150 is coupled between the other end of each phase winding and the second inverter 140. Specifically, the second phase isolation relay circuit 150 includes three second phase isolation relays 151, 152, and 153 that are each coupled between the other end of the respective corresponding phase winding and the second inverter 140. The second phase isolation relay 151 is coupled between a coupling node of FETs 141H and 141L, and the other end of the U-phase winding M1. The second phase isolation relay 152 is coupled between a coupling node of FETs 142H and 142L, and the other end of the V-phase winding M2. The second phase isolation relay 153 is coupled between a coupling node of FETs 143H and 143L, and the other end of the W-phase winding M3. This circuit configuration allows the second phase isolation relay circuit 150 to switch between connection and disconnection of the other end of each phase winding to and from the second inverter 140.

The first neutral point relay circuit 130 is coupled to one end of each phase winding. The first neutral point relay circuit 130 includes three first neutral point relays 131, 132, and 133 one end of each of which is coupled to a common first node N1 and the other end of each of which is coupled to one end of the respective corresponding phase winding. Specifically, one end of the first neutral point relay 131 is coupled to the first node N1, and the other end is coupled to one end of the U-phase winding M1. One end of the first neutral point relay 132 is coupled to the first node N1, and the other end is coupled to one end of the V-phase winding M2. One end of the first neutral point relay 133 is coupled to the first node N1, and the other end is coupled to one end of the W-phase winding M3. This circuit configuration allows the first neutral point relay circuit 130 to switch between connection and disconnection of one end of each of the phase windings to and from the one end of each other phase winding.

The second neutral point relay circuit 160 is coupled to the other end of each phase winding. The second neutral point relay circuit 160 includes three second neutral point relays 161, 162, and 163 one end of each of which is coupled to a common second node N2 and the other end of each of which is coupled to the other end of the respective corresponding phase winding. Specifically, one end of the second neutral point relay 161 is coupled to the second node N2, and the other end is coupled to the other end of the U-phase winding M1. One end of the second neutral point relay 162 is coupled to the second node N2, and the other end is coupled to the other end of the V-phase winding M2. One end of the second neutral point relay 163 is coupled to the second node N2, and the other end is coupled to the other end of the W-phase winding M3. This circuit configuration allows the second neutral point relay circuit 160 to switch between connection and disconnection of the other end of each of the phase windings to and from the other end of each other phase winding.

The on/off-states of the first phase isolation relays 121, 122, and 123, the first neutral point relays 131, 132, and 133, the second phase isolation relays 151, 152, and 153, and the second neutral point relays 161, 162, and 163 may be controlled by, for example, a microcontroller or dedicated driver. As these relays, a wide variety of transistors, such as a FET and IGBT, can be used. Alternatively, as the relays, a mechanical relay, TRIAC, thyristor, etc., may be used. As the relays, any element that can make and break electrical connection can be used. It is herein assumed that a FET is used as each relay, and in the description that follows, each relay is denoted by a FET. For example, the first phase isolation relays 121, 122, and 123 are denoted by the FETs 121, 122, and 123, respectively.

The power conversion device 100 is coupled between a power supply 101 and a GND. Specifically, the first and second inverters 110 and 140 are each coupled between the power supply 101 and the GND. Power is supplied from the power supply 101 to the first and second inverters 110 and 140.

The power supply 101 generates a predetermined power supply voltage. The power supply 101 may, for example, be a DC power supply. Note that the power supply 101 may be an AC/DC converter or DC/DC converter, or alternatively, a battery (electric battery). The power supply 101 may be a single power supply that is shared by the first and second inverters 110 and 140. Alternatively, a first power supply for the first inverter 110 and a second power supply for the second inverter 140 may be provided.

A coil 102 is provided between the power supply 101 and the power conversion device 100. The coil 102 functions as a noise filter to perform smoothing so that high-frequency noise contained in a voltage waveform supplied to each inverter or high-frequency noise occurring in each inverter does not flow into the power supply 101. A capacitor or capacitors 103 are coupled to power supply terminals of the inverters. The capacitor 103 is a so-called bypass capacitor, and prevents or reduces voltage ripple. The capacitor 103 is, for example, an electrolytic capacitor. The capacities and number of capacitors 103 that are used are determined as appropriate, taking into account design and specifications, etc.

In the example configuration of FIG. 1, a shunt resistor is provided in each leg of each inverter. Note that the first and second inverters 110 and 140 can include six or less shunt resistors. The six or less shunt resistors can be coupled between the six or less low-side switching elements of the six legs of the first and second inverters 110 and 140, and the GND. In the case where this configuration is extended to an n-phase motor, the first and second inverters 110 and 140 can include 2n or less shunt resistors. The 2n or less shunt resistors can be coupled between the 2n or less low-side switching elements of the 2n legs of the first and second inverters 110 and 140, and the GND.

Figure 2:
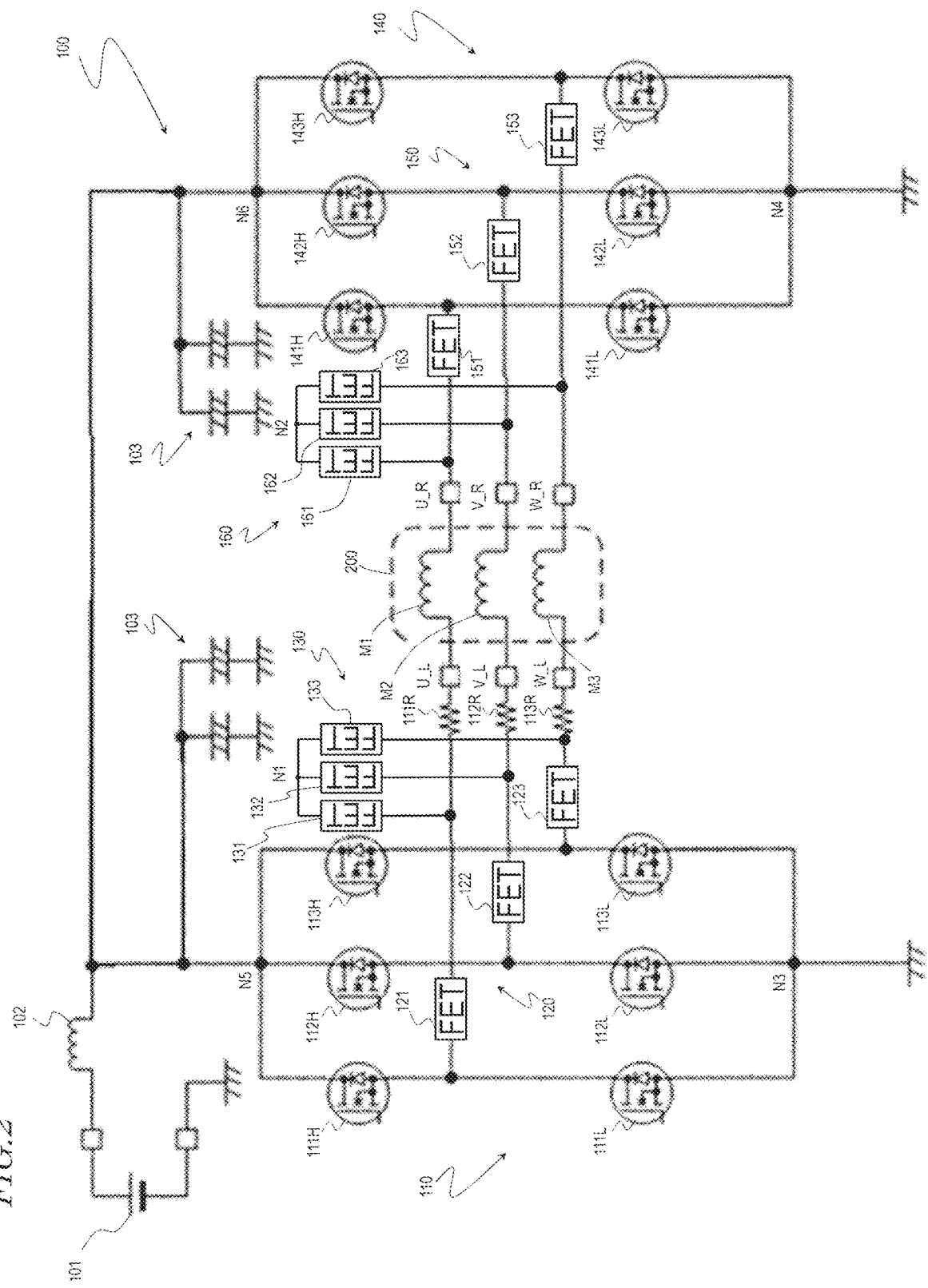
FIG. 2 is a circuit diagram showing another circuit configuration of the power conversion device 100 of the illustrative first embodiment.

FIG. 2 schematically shows another circuit configuration of the power conversion device 100 of this embodiment. Three shunt resistors can be disposed between the legs of the first or second inverter 110 or 140 and the windings M1, M2, and M3. For example, shunt resistors 111R, 112R, and 113R may each be disposed between the first inverter 110 and one end of the corresponding one of the windings M1, M2, and M3. Alternatively, for example, although not shown, shunt resistors 111R and 112R may each be disposed between the first inverter 110 and one end of the corresponding one of the windings M1 and M2, and a shunt resistor 143R may be disposed between the second inverter 140 and the other end of the winding M3. In such a configuration, it is sufficient to dispose three shunt resistors for the U-, V-, and W-phases, and at least two shunt resistors are provided.

Figure 3:
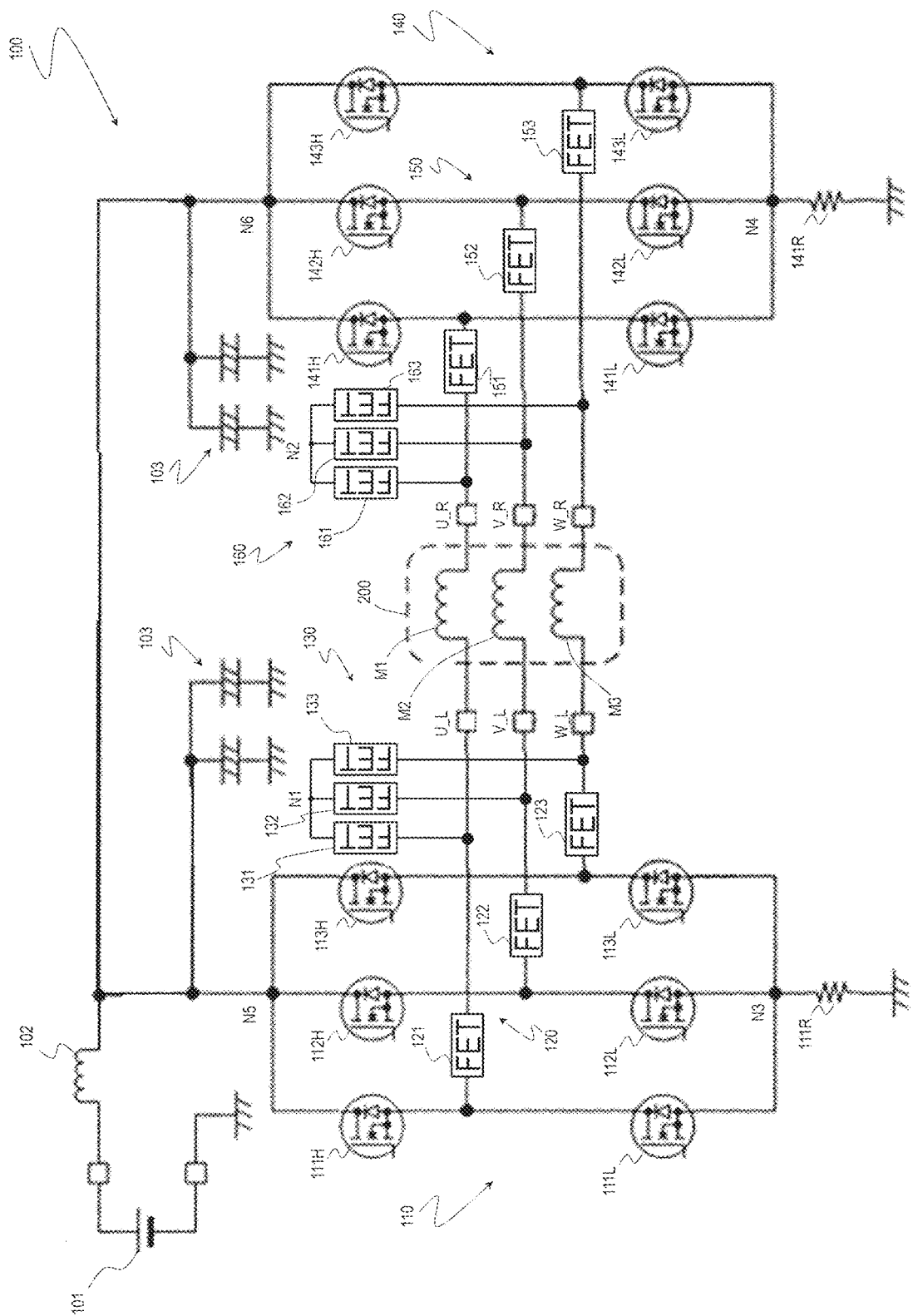
FIG. 3 is a circuit diagram showing still another circuit configuration of the power conversion device 100 of the illustrative first embodiment.

FIG. 3 schematically shows still another circuit configuration of the power conversion device 100 of this embodiment. For example, a single shunt resistor may be shared by the phase windings in each inverter. A single shunt resistor 111R is, for example, coupled between a low-side node N3 (coupling point of the legs) of the first inverter 110, and the GND. Another single shunt resistor 141R may, for example, be coupled between a low-side node N4 of the second inverter 140, and the GND. Note that a motor current is detected using the shunt resistors of an inverter that is operating normally. Therefore, the shunt resistors can be disposed at positions that allow for detection of a motor current irrespective of the positions of the phase isolation relay circuits. Alternatively, as with the low side, a single shunt resistor 111R is, for example, coupled between a high-side node N5 of the first inverter 110, and the power supply 101, and another single shunt resistor 141R is, for example, coupled between a high-side node N6 of the second inverter 140, and the power supply 101. Thus, the number of shunt resistors that are used, and the arrangement of the shunt resistors, are determined as appropriate, taking into account manufacturing cost, design, specifications, etc.

Figure 4:
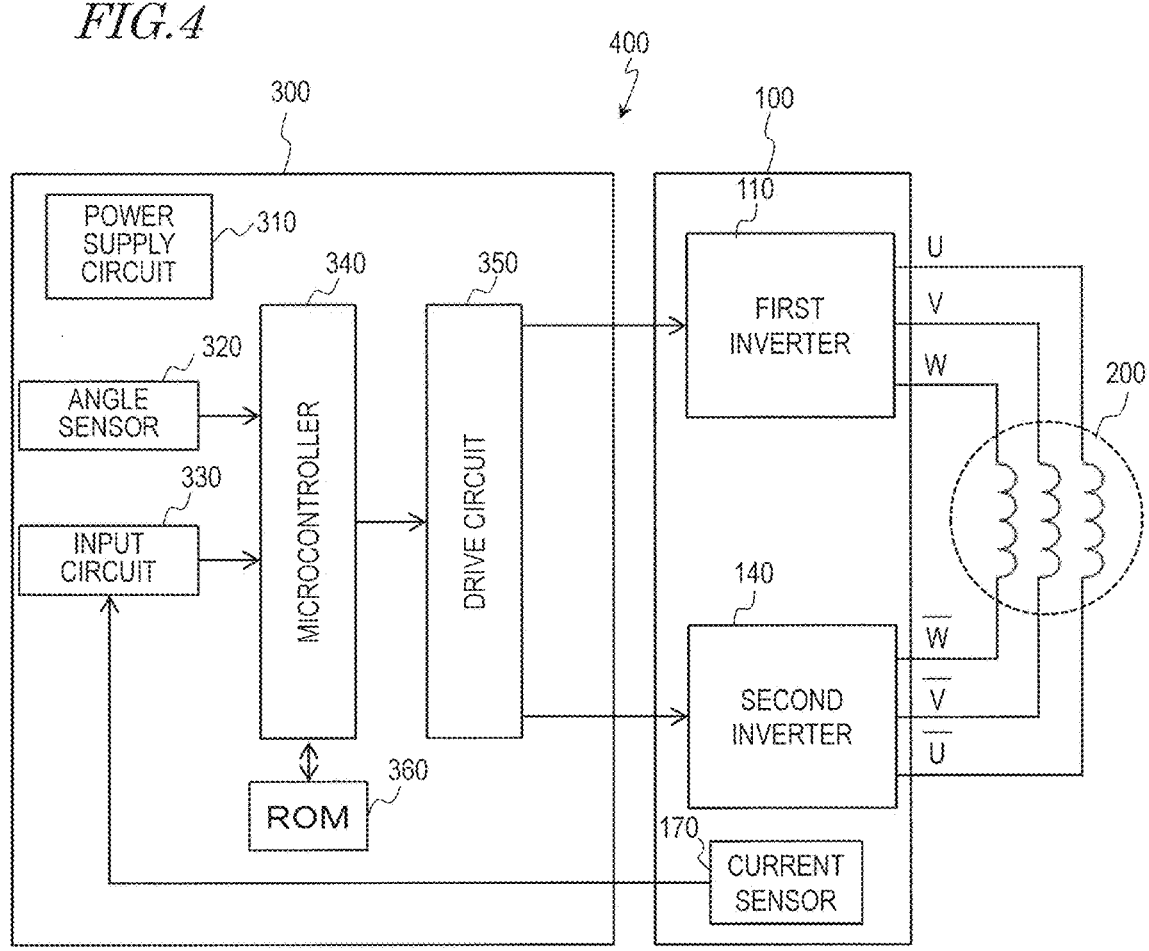
FIG. 4 is a block diagram showing a typical block configuration of a motor drive unit 400 including the power conversion device 100 of the illustrative first embodiment.

FIG. 4 schematically shows a typical block configuration of a motor drive unit 400 that includes the power conversion device 100.

The motor drive unit 400 includes the power conversion device 100, the motor 200, and a control circuit 300.

The control circuit 300 includes, for example, a power supply circuit 310, an angle sensor 320, an input circuit 330, a microcontroller 340, a drive circuit 350, and a ROM 360. The control circuit 300 is coupled to the power conversion device 100, and controls the power conversion device 100 to drive the motor 200. Specifically, the control circuit 300 controls the rotor such that the rotor takes a desired position, rotational speed, and current, etc., and can achieve closed-loop control. Note that the control circuit 300 may include a torque sensor instead of the angle sensor. In this case, the control circuit 300 can control the rotor such that the rotor takes a desired motor torque.

The power supply circuit 310 generates a DC voltage (e.g., 3 V or 5 V) used for the circuit blocks. The angle sensor 320 is, for example, a resolver or Hall IC. The angle sensor 320 detects the angle of rotation of the rotor of the motor 200 (hereinafter referred to as a "rotation signal"), and outputs the rotation signal to the microcontroller 340. The input circuit 330 receives a motor current value (hereinafter referred to as an "actual current value") detected by the current sensor 170, and if necessary, converts the level of the actual current value into an input level of the microcontroller 340, and outputs the resultant actual current value to the microcontroller 340.

The microcontroller 340 controls the switching operation (turning-on or turning-off) of each FET in the first and second inverters 110 and 140 of the power conversion device 100. The microcontroller 340 calculates a desired current value on the basis of the actual current value and the rotor rotation signal, etc., to generate a PWM signal, and outputs the PWM signal to the drive circuit 350. In addition, for example, the microcontroller 340 can turn on and off the first phase isolation relay circuit 120, the first neutral point relay circuit 130, the second phase isolation relay circuit 150, and the second neutral point relay circuit 160 in the power conversion device 100. Alternatively, the drive circuit 350 may turn on and off each relay circuit under the control of the microcontroller 340. The drive circuit 350 is typically a gate driver. The drive circuit 350 generates control signals (gate control signals) for controlling the switching operations of the respective FETs in the first and second inverters 110 and 140, on the basis of the PWM signal, and outputs the control signals to the gates of the respective FETs. Note that the microcontroller 340 may also function as the drive circuit 350. In this case, the control circuit 300 may not include the drive circuit 350.

The ROM 360 is, for example, a writable memory, rewritable memory, or read-only memory. The ROM 360 stores a control program including instructions to cause the microcontroller 340 to control the power conversion device 100. For example, the control program is temporarily loaded to a RAM (not shown) during booting.

The power conversion device 100 performs control under normal conditions and control under abnormal conditions. The control circuit 300 (mainly the microcontroller 340) can switch the control of the power conversion device 100 from the control under normal conditions to the control under abnormal conditions. The on/off-states of the first phase isolation relay circuit 120, the first neutral point relay circuit 130, the second phase isolation relay circuit 150, and the second neutral point relay circuit 160 are determined according to the type of the control.

The on/off-state of each relay circuit, and an electrical connection relationship between the first and second inverters 110 and 140 and the motor 200 in the on/off-states, will now be described in detail.

The control circuit 300 controls the first phase isolation relay circuit 120 and the first neutral point relay circuit 130 in an either-or manner so that when the first phase isolation relay circuit 120 is turned on, the first neutral point relay circuit 130 is turned off, and when the first phase isolation relay circuit 120 is turned off, the first neutral point relay circuit 130 is turned on. Here, the term "the first phase isolation relay circuit 120 is turned on" means that the FETs 121, 122, and 123 are all turned on, and the term "the first phase isolation relay circuit 120 is turned off" means that the FETs 121, 122, and 123 are all turned off. The term "the first neutral point relay circuit 130 is turned on" means that the FETs 131, 132, and 133 are all turned on, and the term "the first neutral point relay circuit 130 is turned off" means that the FETs 131, 132, and 133 are all turned off.

When the first phase isolation relay circuit 120 is turned on, the first inverter 110 is connected to one end of each phase winding. When the first phase isolation relay circuit 120 is turned off, the first inverter 110 is disconnected from one end of each phase winding. When the first neutral point relay circuit 130 is turned on, one end of each of the phase windings is connected together. When the first neutral point relay circuit 130 is turned off, one end of each of the phase windings is disconnected from each other.

The control circuit 300 controls the second phase isolation relay circuit 150 and the second neutral point relay circuit 160 in an either-or manner so that when the second phase isolation relay circuit 150 is turned on, the second neutral point relay circuit 160 is turned off, and when the second phase isolation relay circuit 150 is turned off, the second neutral point relay circuit 160 is turned on. Here, the term "the second phase isolation relay circuit 150 is turned on" means that the FETs 151, 152, and 153 are all turned on, and the term "the second phase isolation relay circuit 150 is turned off" means that the FETs 151, 152, and 153 are all turned off. The term "the second neutral point relay circuit 160 is turned on" means that the FETs 161, 162, and 163 are all turned on, and the term "the second neutral point relay circuit 160 is turned off" means that the FETs 161, 162, and 163 are all turned off.

When the second phase isolation relay circuit 150 is turned on, the second inverter 140 is connected to the other end of each phase winding, and when the second phase isolation relay circuit 150 is turned off, the second inverter 140 is disconnected from the other end of each phase winding. When the second neutral point relay circuit 160 is turned on, the other end of each of the phase windings is connected together, and when the second neutral point relay circuit 160 is turned off, the other end of each of the phase windings is disconnected from each other.

(1. Control Under Normal Conditions)

Firstly, a specific example method for controlling the power conversion device 100 under normal conditions will be described. As described above, the term "normal conditions" means that none of the FETs in the first and second inverters 110 and 140 has failed.

Under normal conditions, the control circuit 300 turns on the first phase isolation relay circuit 120 and turns off the first neutral point relay circuit 130, and turns on the second phase isolation relay circuit 150 and turns off the second neutral point relay circuit 160. As a result, the first and second neutral point relay circuits 130 and 160 are disconnected from each phase winding, and the first inverter 110 is connected through the first phase isolation relay circuit 120 to one end of each phase winding, and the second inverter 140 is connected through the second phase isolation relay circuit 150 to the other end of each phase winding. In this connection state, the control circuit 300 performs three-phase conduction control using both of the first and second inverters 110 and 140 to drive the motor 200. Specifically, the control circuit 300 performs the three-phase conduction control by performing switching control on the FETs of the first inverter 110 and the FETs of the second inverter 140 using opposite phases (phase difference=180°). For example, in the case of an H-bridge including the FETs 111L, 111H, 141L, and 141H, when the FET 111L is turned on, the FET 141L is turned off, and when the FET 111L is turned off, the FET 141L is turned on. Similarly, when the FET 111H is turned on, the FET 141H is turned off, and when the FET 111H is turned off, the FET 141H is turned on.

Figure 5:
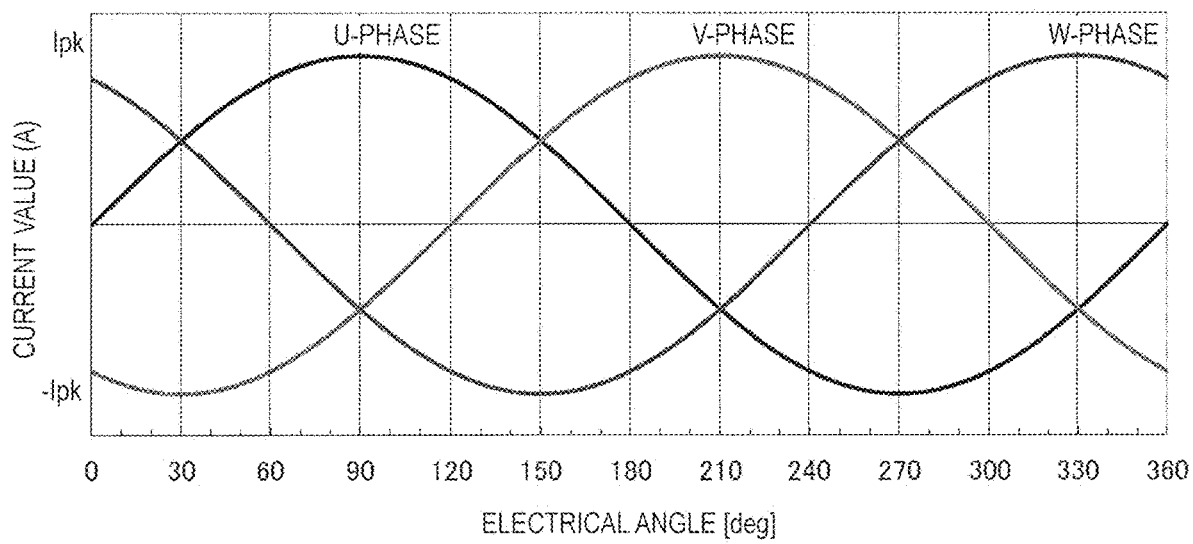
FIG. 5 is a diagram showing current waveforms (sine waves) that are obtained by plotting values of currents flowing through a U-phase, a V-phase, and a W-phase winding of a motor 200 when the power conversion device 100 is controlled by three-phase conduction control under normal conditions.

FIG. 5 shows example current waveforms (sine waves) that are obtained by plotting values of currents flowing through the U-phase, V-phase, and W-phase windings of the motor 200 when the power conversion device 100 is controlled by the three-phase conduction control under normal conditions. The horizontal axis represents motor electrical angles (deg), and the vertical axis represents current values (A). In the current waveforms of FIG. 5, current values are plotted every electrical angle of 30°. $I_{pk}$ represents the greatest current value (peak current value) of each phase.

Table 1 shows the values of currents flowing through the terminals of each inverter every predetermined electrical angle of the sine waves of FIG. 5. Specifically, Table 1 shows the values of currents flowing through the terminals U_L, V_L, and W_L of the first inverter 110 (the bridge circuit L) every electrical angle of 30°, and the values of currents flowing through the terminals U_R, V_R, and W_R of the second inverter 140 (the bridge circuit R) every electrical angle of 30°. Here, a positive current direction with respect to the bridge circuit L is defined as a direction in which a current flows from a terminal of the bridge circuit L to a terminal of the bridge circuit R. This definition applies to current directions shown in FIG. 5. A positive current direction with respect to the bridge circuit R is defined as a direction in which a current flows from a terminal of the bridge circuit R to a terminal of the bridge circuit L. Therefore, there is a phase difference of 180° between the current in the bridge circuit L and the current in the bridge circuit R. In Table 1, the magnitude of a current value $I_1$ is $[(3)^{1/2}/2]*I_{pk}$, and the magnitude of a current value $I_2$ is $I_{pk}/2$.

At an electrical angle of 0°, a current does not flow through the U-phase winding M1. A current having a magnitude of $I_1$ flows through the V-phase winding M2 from the bridge circuit R to the bridge circuit L, and a current having a magnitude of $I_1$ flows through the W-phase winding M3 from the bridge circuit L to the bridge circuit R.

At an electrical angle of 30°, a current having a magnitude of $I_2$ flows through the U-phase winding M1 from the bridge circuit L to the bridge circuit R, a current having a magnitude of $I_{pk}$ flows through the V-phase winding M2 from the bridge circuit R to the bridge circuit L, and a current having a magnitude of $I_2$ flows through the W-phase winding M3 from the bridge circuit L to the bridge circuit R.

At an electrical angle of 60°, a current having a magnitude of $I_1$ flows through the U-phase winding M1 from the bridge circuit L to the bridge circuit R, and a current having a magnitude of $I_1$ flows through the V-phase winding M2 from the bridge circuit R to the bridge circuit L. A current does not flow through the W-phase winding M3.

At an electrical angle of 90°, a current having a magnitude of $I_{pk}$ flows through the U-phase winding M1 from the bridge circuit L to the bridge circuit R, a current having a magnitude of $I_2$ flows through the V-phase winding M2 from the bridge circuit R to the bridge circuit L, and a current having a magnitude of $I_2$ flows through the W-phase winding M3 from the bridge circuit R to the bridge circuit L.

At an electrical angle of 120°, a current having a magnitude of $I_1$ flows through the U-phase winding M1 from the bridge circuit L to the bridge circuit R, and a current having a magnitude of $I_1$ flows through the W-phase winding M3 from the bridge circuit R to the bridge circuit L. A current does not flow through the V-phase winding M2.

At an electrical angle of 150°, a current having a magnitude of $I_2$ flows through the U-phase winding M1 from the bridge circuit L to the bridge circuit R, a current having a magnitude of $I_2$ flows through the V-phase winding M2 from the bridge circuit L to the bridge circuit R, and a current having a magnitude of $I_{pk}$ flows through the W-phase winding M3 from the bridge circuit R to the bridge circuit L.

At an electrical angle of 180°, a current does not flow through the U-phase winding M1. A current having a magnitude of $I_1$ flows through the V-phase winding M2 from the bridge circuit L to the bridge circuit R, and a current having a magnitude of $I_1$ flows through the W-phase winding M3 from the bridge circuit R to the bridge circuit L.

At an electrical angle of 210°, a current having a magnitude of $I_2$ flows through the U-phase winding M1 from the bridge circuit R to the bridge circuit L, a current having a magnitude of $I_{pk}$ flows through the V-phase winding M2 from the bridge circuit L to the bridge circuit R, and a current having a magnitude of $I_2$ flows through the W-phase winding M3 from the bridge circuit R to the bridge circuit L.

TABLE 1

| Operation | | Electrical angles [deg] | | | | | | | | | | | |
|---|---|---|---|---|---|---|---|---|---|---|---|---|---|
| under normal conditions | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At an electrical angle of 240°, a current having a magnitude of $I_1$ flows through the U-phase winding M1 from the bridge circuit R to the bridge circuit L, and a current having a magnitude of $I_1$ flows through the V-phase winding M2 from the bridge circuit L to the bridge circuit R. A current does not flow through the W-phase winding M3.

At an electrical angle of 270°, a current having a magnitude of $I_{pk}$ flows through the U-phase winding M1 from the bridge circuit R to the bridge circuit L, a current having a magnitude of $I_2$ flows through the V-phase winding M2 from the bridge circuit L to the bridge circuit R, and a current having a magnitude of $I_2$ flows through the W-phase winding M3 from the bridge circuit L to the bridge circuit R.

At an electrical angle of 300°, a current having a magnitude of $I_1$ flows through the U-phase winding M1 from the bridge circuit R to the bridge circuit L, and a current having a magnitude of $I_1$ flows through the W-phase winding M3 from the bridge circuit L to the bridge circuit R. A current does not flow through the V-phase winding M2.

At an electrical angle of 330°, a current having a magnitude of $I_2$ flows through the U-phase winding M1 from the bridge circuit R to the bridge circuit L, a current having a magnitude of $I_2$ flows through the V-phase winding M2 from the bridge circuit R to the bridge circuit L, and a current having a magnitude of $I_{pk}$ flows through the W-phase winding M3 from the bridge circuit L to the bridge circuit R.

In the three-phase conduction control of this embodiment, the sum of currents flowing through the three phase windings is invariably "0" at any electrical angle, where the directions of currents are taken into account. For example, the control circuit 300 controls the switching operations of the FETs of the bridge circuits L and R by PWM control so as to obtain the current waveforms of FIG. 5.

(2. Control Under Abnormal Conditions)

A specific example method for controlling the power conversion device 100 under abnormal conditions will be described. As described above, the term "abnormal conditions" mainly means that a FET(s) has failed. Failures of a FET are roughly divided into an "open-circuit failure" and a "short-circuit failure." The "open-circuit failure" with respect to a FET means that there is an open circuit between the source and drain of the FET (in other words, a resistance rds between the source and drain has a high impedance). The "short-circuit failure" with respect to a FET means that there is a short circuit between the source and drain of the FET.

Referring back to FIG. 1, it is considered that, during the operation of the power conversion device 100, a random failure occurs in which one of the 12 FETs of the two inverters randomly fails. The present disclosure is mainly directed to a method for controlling the power conversion device 100 when a random failure has occurred. Note that the present disclosure is also directed to a method for controlling the power conversion device 100 when multiple FETs have failed together, etc. Such a multi-failure means that, for example, a failure occurs in the high-side and low-side switching elements of one leg simultaneously.

When the power conversion device 100 is used for a long period of time, a random failure is likely to occur. Note that the random failure is different from the manufacture failure that may occur during manufacture. When even one of the FETs in the two inverters fails, the normal three-phase conduction control can be no longer carried out.

A failure may be detected as follows, for example. The drive circuit 350 monitors the drain-source voltage Vds of a FET, and compares Vds with a predetermined threshold voltage, in order to detect a failure in the FET. The threshold voltage is set in the drive circuit 350 by, for example, data communication with an external IC (not shown), and an external part. The drive circuit 350 is coupled to a port of the microcontroller 340, and sends a failure detection signal to the microcontroller 340. For example, the drive circuit 350, when detecting a failure in a FET, asserts the failure detection signal. The microcontroller 340, when receiving an asserted failure detection signal, reads internal data from the drive circuit 350, and determines which of the FETs of the two inverters has failed.

Alternatively, a failure may be detected as follows, for example. The microcontroller 340 can detect a failure in a FET on the basis of a difference between an actual current value of the motor and a desired current value. Note that the failure detection is not limited to these techniques, and may be performed using a wide variety of known techniques related to the failure detection.

The microcontroller 340, when receiving an asserted failure detection signal, switches the control of the power conversion device 100 from the control under normal conditions to the control under abnormal conditions. For example, a timing at which the control of the power conversion device 100 is switched from the control under normal conditions to the control under abnormal conditions is about 10-30 msec after the assertion of a failure detection signal.

In the description of the control under abnormal conditions embodiment, of the two inverters, the first inverter 110 is assumed to be a failed inverter, and the second inverter 140 is assumed to be operating normally. Note that when the second inverter 140 is a failed inverter, then if the roles in the control of the first inverter 110 and the second inverter 140 are switched, the power control device 100 can be similarly controlled. The control will now be described, concerning separate situations, i.e., a situation that a failure has occurred in a high-side switching element, and a situation that a failure has occurred in a low-side switching element.

(2-1. Failure in High-Side Switching Element)

It is assumed that an open-circuit failure has occurred in the FET 111H of the high-side switching elements (the FETs 111H, 112H, and 113H) of the first inverter 110. Note that, also in the event of an open-circuit failure in the FET 112H or 113H, the power conversion device 100 can be controlled by a control method described below.

In the event of an open-circuit failure in the FET 111H, the control circuit 300 turns off the first phase isolation relay circuit 120 and turns on the first neutral point relay circuit 130, and turns on the second phase isolation relay circuit 150 and turns off the second neutral point relay circuit 160. As a result, the first inverter 110, which includes the failed FET 111H, is disconnected from the motor 200 (i.e., one end of each phase winding), leaving only the second inverter 140, which is operating normally, connected to the motor 200 (i.e., the other end of each phase winding). In this connection state, the first neutral point relay circuit 130 is on, and therefore, the first node N1 functions as a neutral point for the phase windings. As used herein, the term "a neutral point is formed" means that a certain node functions as the neutral point. Note that a neutral point is not formed in the second neutral point relay circuit 160. In the first inverter 110, it is desirable that all the FETs 112H, 113H, 111L, 112L, and 113L other than the failed FET 111H should be off. For example, the control circuit 300 turns off all the FETs 112H, 113H, 111L, 112L, and 113L other than the failed FET 111H in the first inverter 110. The control circuit 300 controls the second inverter 140 to drive the motor 200 with a neutral point being formed in the first neutral point relay circuit 130.

In this control, the first phase isolation relay circuit 120 can be used to disconnect the first inverter 110 from the motor 200, and the first neutral point relay circuit 130 can be used to form a closed loop of a drive current. As a result, suitable current control can be performed even under abnormal conditions.

Figure 6:
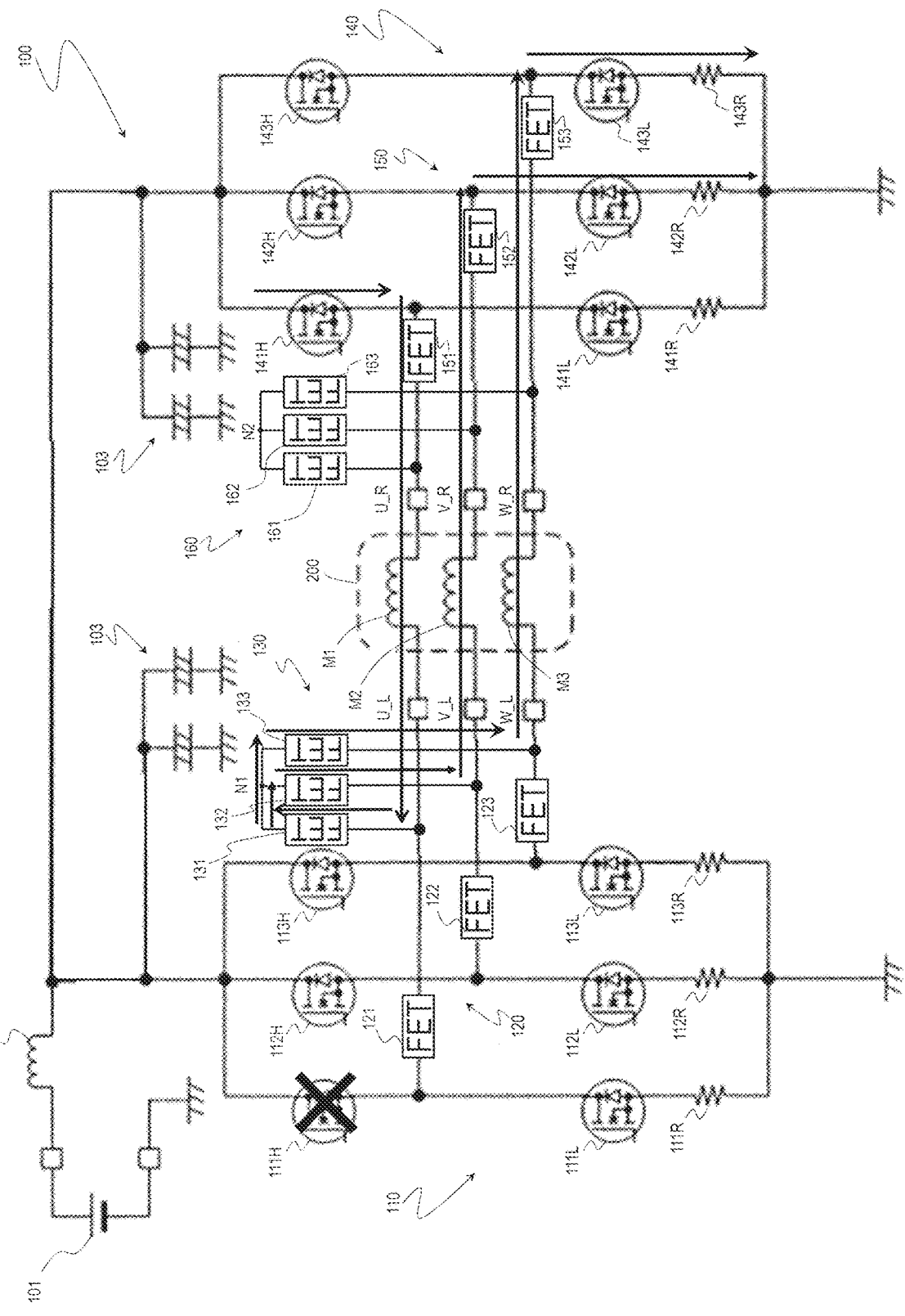
FIG. 6 is a schematic diagram showing flows of currents in the power conversion device 100 that occur at a motor electrical angle of, for example, 270° in control under abnormal conditions.
Figure 7:
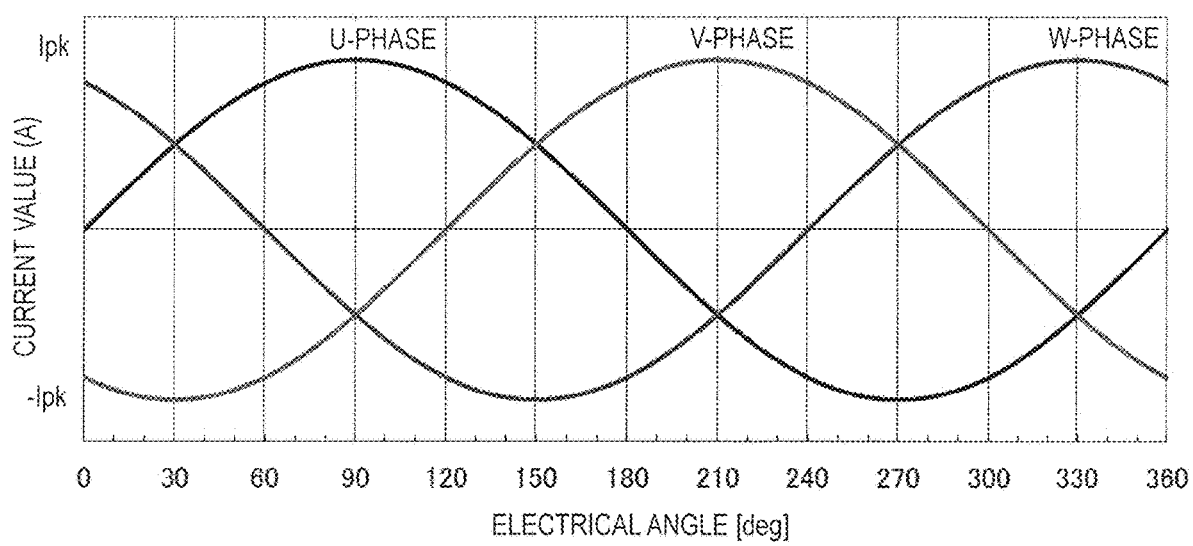
FIG. 7 is a diagram showing current waveforms that are obtained by plotting values of currents flowing through a U-phase, a V-phase, and a W-phase winding of a motor 200 in control under abnormal conditions.

FIG. 6 schematically shows flows of currents in the power conversion device 100 that occur at a motor electrical angle of, for example, 270° in the control under abnormal conditions. The three solid lines represent currents flowing from the power supply 101 to the motor 200. FIG. 7 shows example current waveforms that are obtained by plotting values of currents flowing through the U-phase, V-phase, and W-phase windings of the motor 200 in the control under abnormal conditions. The horizontal axis represents motor electrical angles (deg), and the vertical axis represents current values (A).

In the state shown in FIG. 6, the FETs 141H, 142L, and 143L are on and the FETs 141L, 142H, and 143H are off in the second inverter 140. A current flowing through the FET 141H of the second inverter 140 flows through the winding M1 and the FET 131 of the first neutral point relay circuit 130 to the neutral point. A portion of the current flows through the FET 132 to the winding M2, and the remaining portion of the current flows through the FET 133 to the winding M3. The currents flowing through the windings M2 and M3 flow through the FETs 142L and 143L, respectively, of the second inverter 140 to the GND.

The FET 111H has an open-circuit failure, and the FETs 112H, 113H, 111L, 112L, and 113L other than the FET 111H of the first inverter 110 are off. Therefore, a current does not flow from the power supply 101 into the first inverter 110. In addition, the first inverter 110 is disconnected from the motor 200 by the first phase isolation relay circuit 120, and therefore, a current does not flow from the second inverter 140 to the first inverter 110.

Table 2 shows example values of currents flowing through terminals of the second inverter 140 every predetermined electrical angle of the current waveforms of FIG. 7. Specifically, Table 2 shows examples values of currents flowing through the terminals U_R, V_R, and W_R of the second inverter 140 (the bridge circuit R) every electrical angle of 30°. The definitions of the directions of currents are as described above. Note that, according to the definitions of the current directions, the sign (positivity or negativity) of each current value shown in FIG. 7 is opposite to that shown in Table 2 (phase difference: 180°).

the bridge circuit L to the bridge circuit R, and a current having a magnitude of $I_1$ flows through the V-phase winding M2 from the bridge circuit R to the bridge circuit L. A current does not flow through the W-phase winding M3. The sum of a current(s) flowing into a neutral point and a current(s) flowing out of the neutral point is invariably "0" at any electrical angle. The control circuit 300 controls the switching operations of the FETs of the bridge circuit R by PWM control such that, for example, the current waveforms of FIG. 7 are obtained.

As can be seen from Tables 1 and 2, motor currents flowing through the motor 200 at any electrical angle are the same between the control under normal conditions and the control under abnormal conditions. Therefore, in the control under abnormal conditions, the same motor assistive torque as that in the control under normal conditions is maintained.

Also in the event of a short-circuit failure in the FET 111H, as in the event of an open-circuit failure, the power conversion device 100 can be controlled using the above control method. In the event of a short-circuit failure in which the FET 111H is always on, the FET 121 of the first phase isolation relay circuit 120 is off, and the FETs 112H, 113H, 111L, 112L, and 113L other than the FET 111H are off, and therefore, a current does not flow from the power supply 101 into the first inverter 110.

(2-2. Failure in Low-Side Switching Element)

It is assumed that an open-circuit or short-circuit failure has occurred in the FET 111L of the low-side switching elements (the FETs 111L, 112L, and 113L) of the first inverter 110. The control in this case is similar to that which is performed in the event of a failure in a high-side switching element. Specifically, the control circuit 300 turns off the first phase isolation relay circuit 120 and turns on the first neutral point relay circuit 130, and turns on the second phase isolation relay circuit 150 and turns off the second neutral point relay circuit 160. In addition, the control circuit 300 turns off all the FETs 111H, 112H, 113H, 112L, and 113L other than the failed FET 111L in the first inverter 110. The control circuit 300 controls the second inverter 140 to drive the motor 200 with a neutral point being formed in the first neutral point relay circuit 130.

In the event of a failure in the FET 111L, the FETs 111H, 112H, 113H, 112L, and 113L other than the FET 111L of the first inverter 110 are off, and therefore, a current does not flow from the power supply 101 into the first inverter 110. In addition, the first inverter 110 is disconnected from the motor 200 by the first phase isolation relay circuit 120, and therefore, a current does not flow from the second inverter 140 to the first inverter 110. Note that, also in the event of a failure in the FET 112L or 113L, the power conversion device 100 can be controlled using the above control method.

Thus, when the first inverter 110 includes at least one failed FET, the first inverter 110 can be disconnected from the motor 200 using the first phase isolation relay circuit

TABLE 2

| | | Electrical angles [deg] | | | | | | | | | | |
|---|---|---|---|---|---|---|---|---|---|---|---|---|
| Operation under normal conditions | 0 (360) | 30 | 60 | 90 | 120 | 150 | 180 | 210 | 240 | 270 | 300 | 330 |
| Bridge circuit R U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at an electrical angle of 30°, a current having a magnitude of $I_2$ flows through the U-phase winding M1 from the bridge circuit L to the bridge circuit R, a current having a magnitude of $I_{pk}$ flows through the V-phase winding M2 from the bridge circuit R to the bridge circuit L, and a current having a magnitude of $I_2$ flows through the W-phase winding M3 from the bridge circuit L to the bridge circuit R. At an electrical angle of 60°, a current having a magnitude of $I_1$ flows through the U-phase winding M1 from 120, and the first neutral point relay circuit 130 allows the first node N1 to function as a neutral point for the phase windings.

Figure 8:
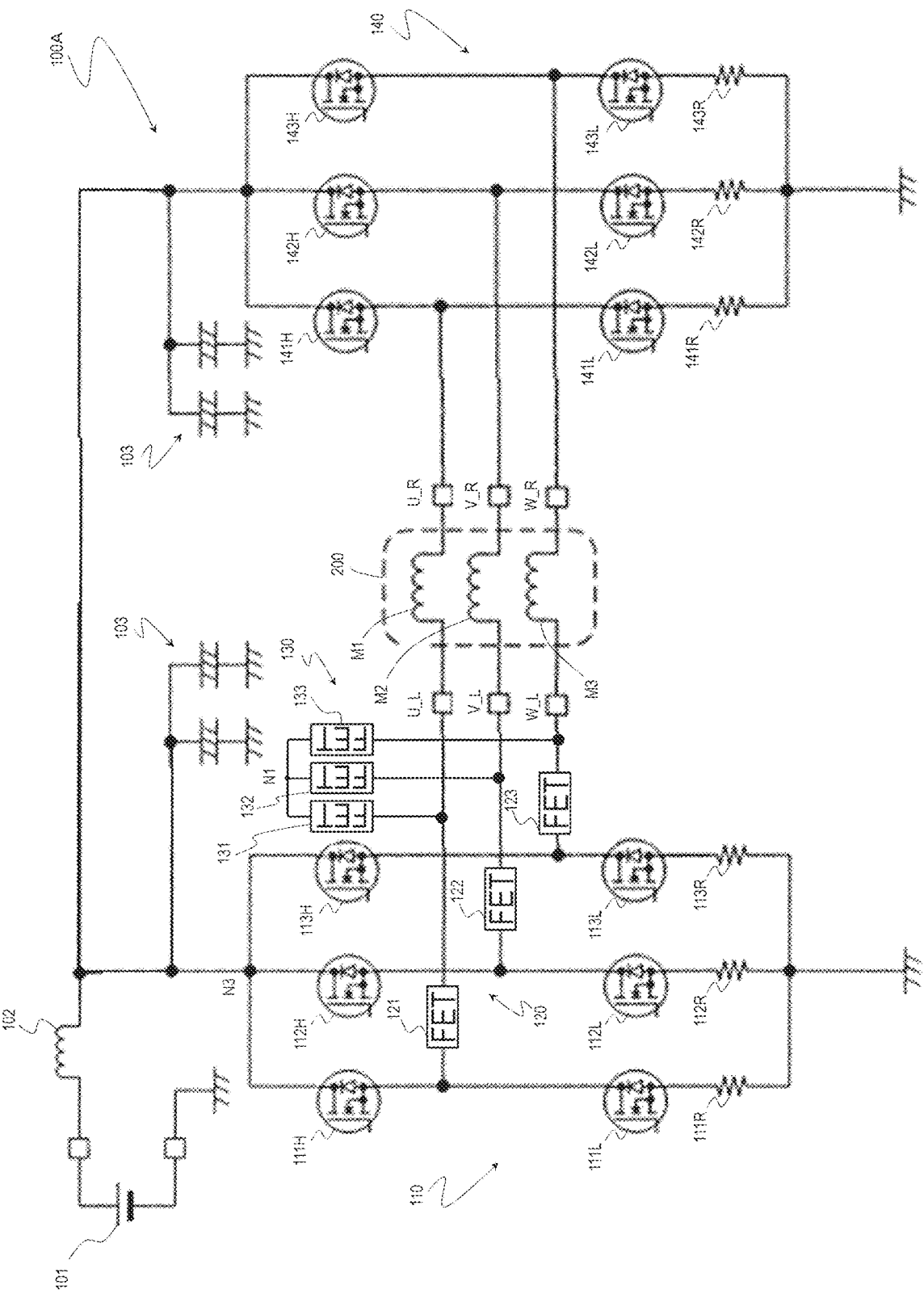
FIG. 8 is a circuit diagram showing a circuit configuration of a power conversion device 100A including a single pair of relay circuits.

A variation of the circuit configuration of the power conversion device 100 will be described with reference to FIG. 8.

In this embodiment, a power conversion device 100 includes two phase isolation relay circuits and two neutral point relay circuits. However, the present disclosure is not limited to this. For example, a power conversion device 100 may include a first phase isolation relay circuit 120 and a first neutral point relay circuit 130 (a single pair of relay circuits). In other words, a power conversion device 100 may optionally have a configuration in which a single pair of relay circuits is provided for one of the inverters FIG. 8 shows a circuit configuration of a power conversion device 100A including a single pair of relay circuits. It is assumed that an inverter coupled to the pair of relay circuits, i.e., the first inverter 110 coupled to the first phase isolation relay circuit 120 and the first neutral point relay circuit 130, has failed. In this case, the control circuit 300 turns off the first phase isolation relay circuit 120, and turns on the first neutral point relay circuit 130. This circuit configuration allows the failed inverter to be disconnected from the motor 200, and allows the first node N1 to function as a neutral point. The control circuit 300 can control the second inverter 140, which is operating normally, to drive the motor 200 with a neutral point being formed in the first neutral point relay circuit 130.

In this embodiment, in the control under abnormal conditions, a power loss can be prevented or reduced, and suitable current control can be performed by forming a closed loop of a drive current.

Second Embodiment

Figure 9:
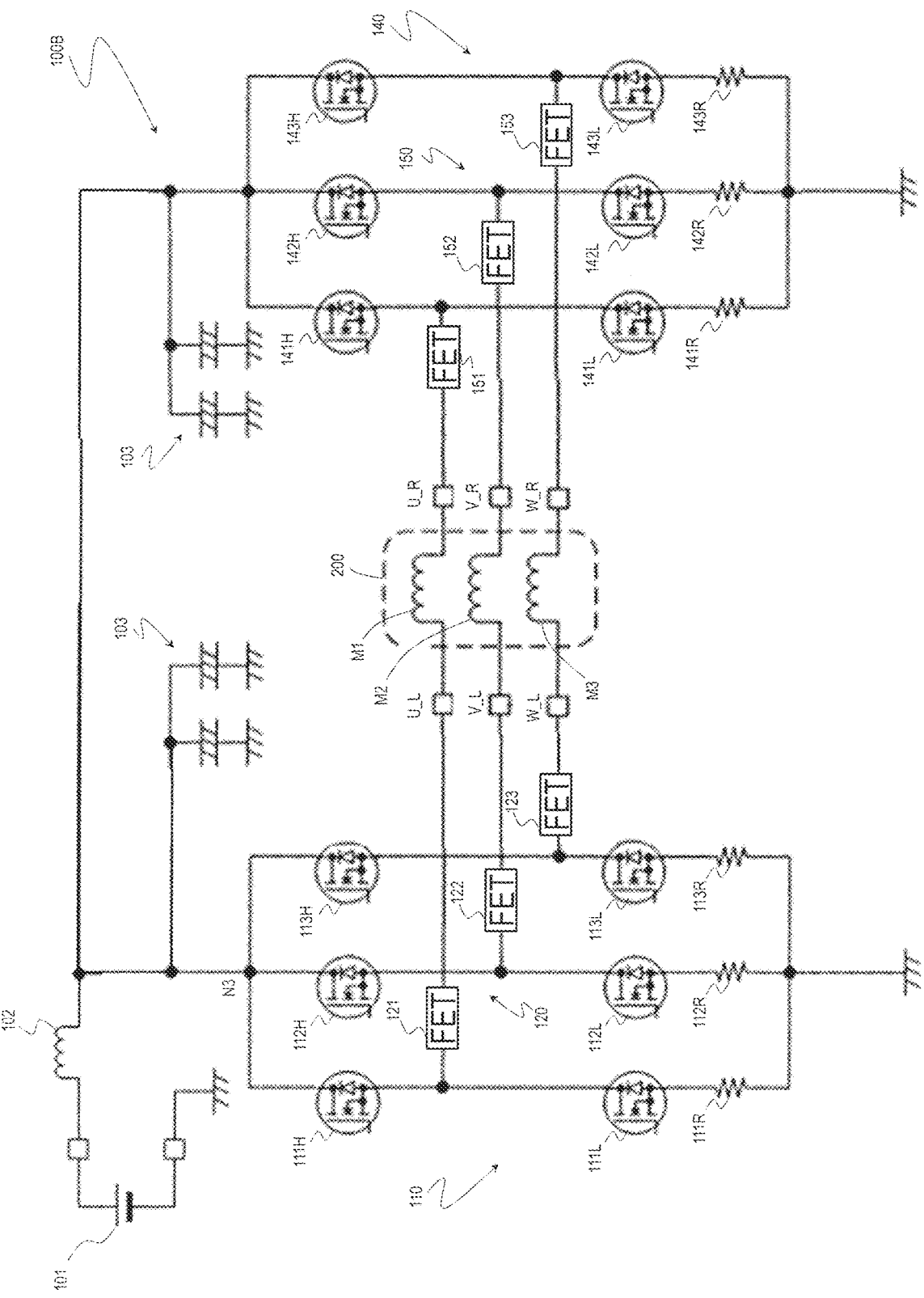
FIG. 9 is a circuit diagram showing a circuit configuration of a power conversion device 100B according to an illustrative embodiment.

Next, another example operation under abnormal conditions of the power conversion device will be described. FIG. 9 schematically shows a circuit configuration of a power conversion device 100B according to this embodiment.

The above power conversion device 100 includes the first phase isolation relay circuit 120, the first neutral point relay circuit 130, the second phase isolation relay circuit 150, and the second neutral point relay circuit 160. The power conversion device 100B of this embodiment includes the first phase isolation relay circuit 120 and the second phase isolation relay circuit 150, but not the first neutral point relay circuit 130 or the second neutral point relay circuit 160. Note that, in the case where a TRIAC is used as a phase isolation relay, the power conversion device 100B may not include the second phase isolation relay circuit 150.

The power conversion device 100B includes at least n phase isolation relays which switch between connection and disconnection of one end of each of the n phase windings of the motor 200 (n is an integer of three or more) to and from the first inverter 110. In this example, the power conversion device 100B includes three phase isolation relays 121, 122, and 123 which switch between connection and disconnection of one end of each of the three phase windings M1, M2, and M3 of the motor 200 to and from the first inverter 110. The power conversion device 100B also includes n phase isolation relays which switch between connection and disconnection of the other end of each of the n phase windings of the motor 200 to and from the second inverter 140. In this example, the power conversion device 100B includes three phase isolation relays 151, 152, and 153 which switch between connection and disconnection of the other end of each of the windings M1, M2, and M3 of the motor 200 to and from the second inverter 140.

Figure 10:
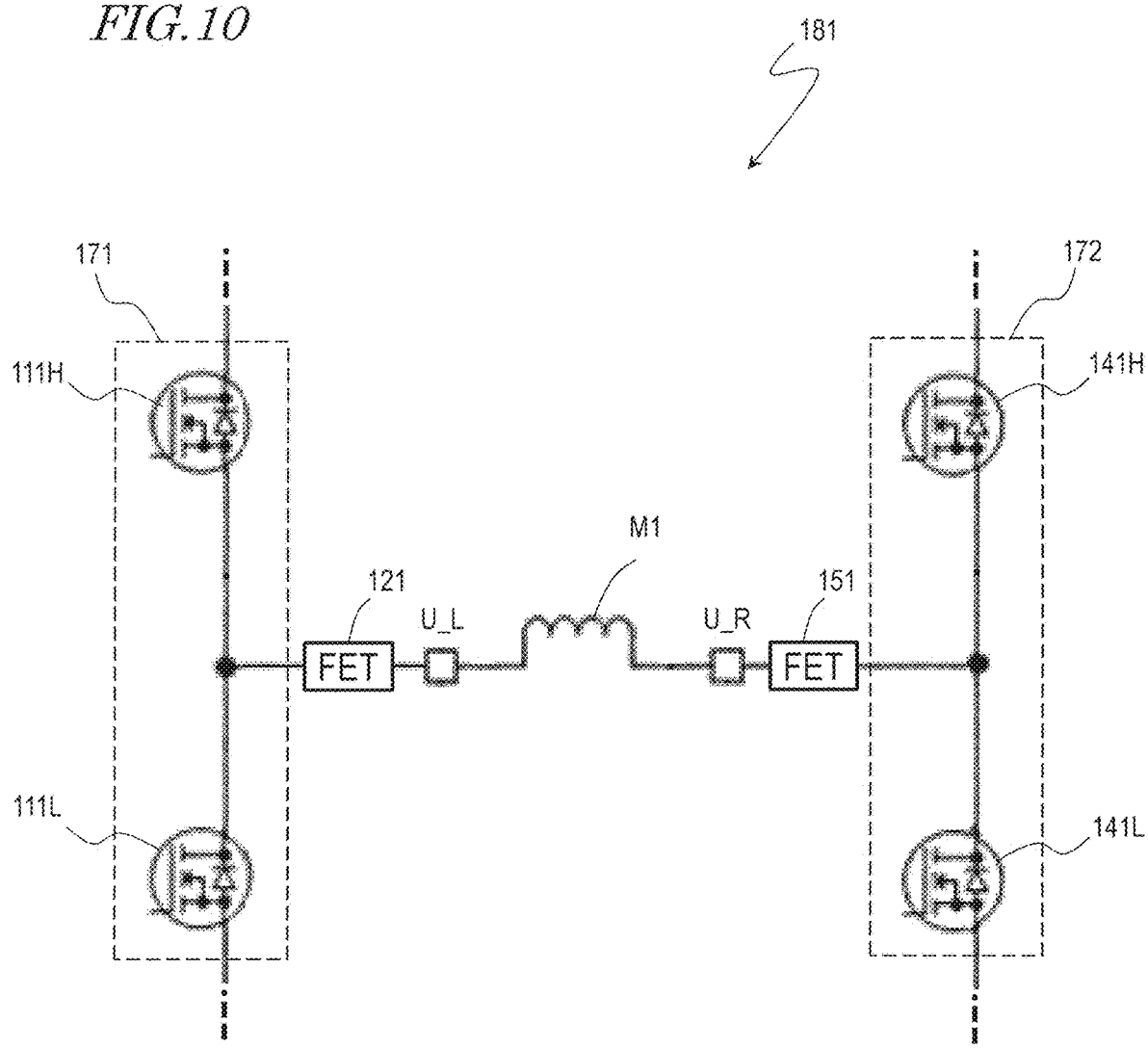
FIG. 10 is a diagram showing an H-bridge 181 included in a power conversion device 100B according to an illustrative second embodiment.
Figure 11:
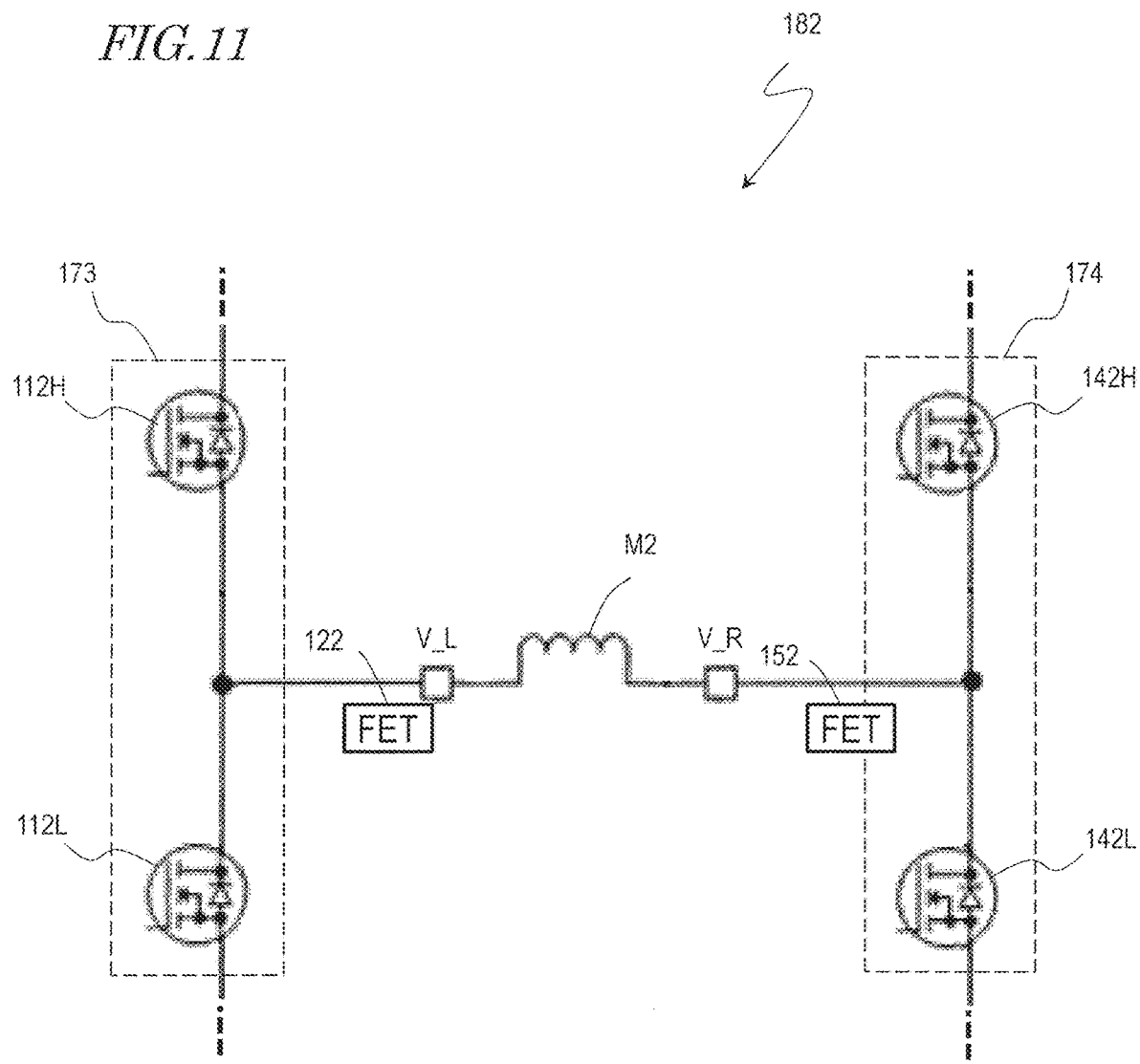
FIG. 11 is a diagram showing an H-bridge 182 included in the power conversion device 100B of the illustrative second embodiment.
Figure 12:
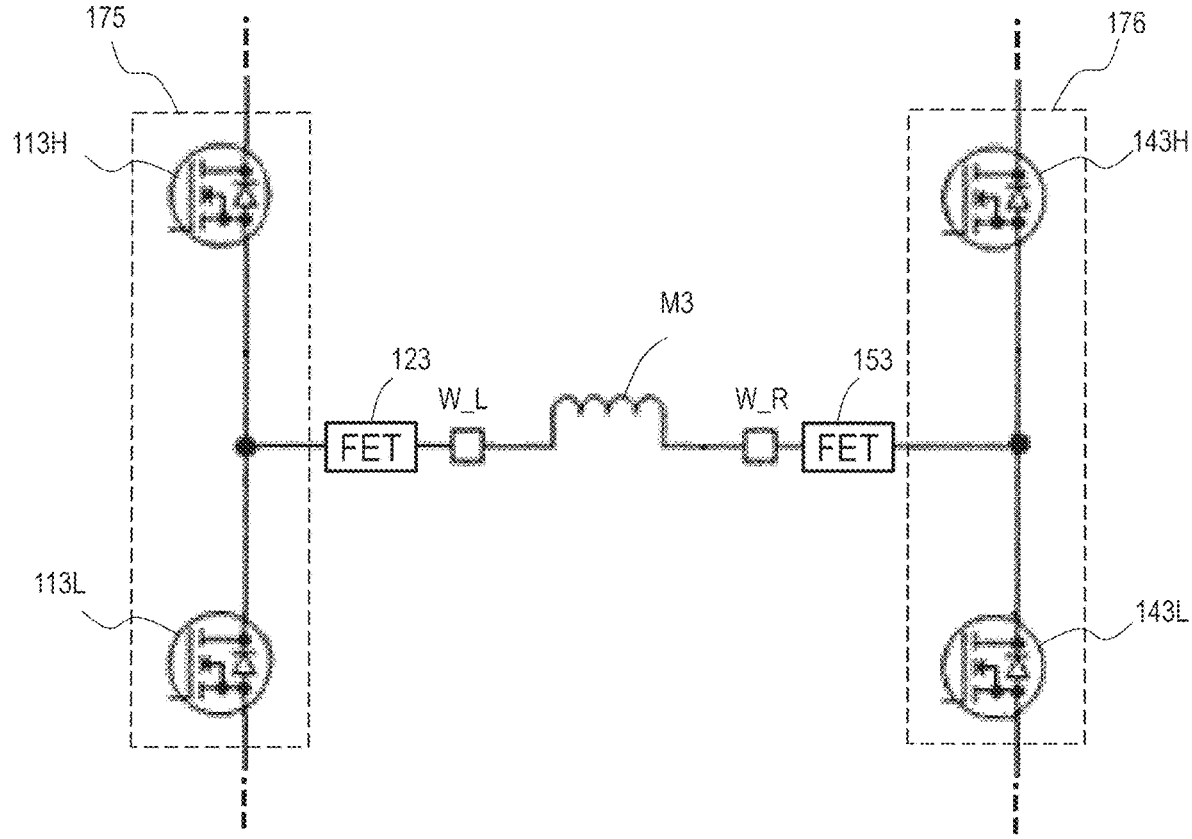
FIG. 12 is a diagram showing an H-bridge 183 included in the power conversion device 100B of the illustrative second embodiment.

FIG. 10, FIG. 11, and FIG. 12 are diagrams showing three H-bridges 181, 182, and 183 included in the power conversion device 100B.

The first inverter 110 has legs 171, 173, and 175. The leg 171 has a FET 111H and a FET 111L. The leg 173 has a FET 112H and a FET 112L. The leg 175 has a FET 113H and a FET 113L.

The second inverter 140 has legs 172, 174, and 176. The leg 172 has a FET 141H and a FET 141L. The leg 174 has a FET 142H and a FET 142L. The leg 176 has a FET 143H and a FET 143L.

The H-bridge 181 of FIG. 10 has the leg 171, the winding M1, and the leg 172. The phase isolation relay 121 is disposed between the leg 171 and the winding M1. The phase isolation relay 151 is disposed between the leg 172 and the winding M1. The H-bridge 182 of FIG. 11 has the leg 173, the winding M2, and the leg 174. The phase isolation relay 122 is disposed between the leg 173 and the winding M2. The phase isolation relay 152 is disposed between the leg 174 and the winding M2. The H-bridge 183 of FIG. 12 has the leg 175, the winding M3, and the leg 176. The phase isolation relay 123 is disposed between the leg 175 and the winding M3. The phase isolation relay 153 is disposed between the leg 176 and the winding M3.

The power conversion device 100B is operated by the three-phase conduction control under normal conditions, as with the above power conversion device 100. In the event of a failure in at least one of the FETs included in the first and second inverters, the operation of the power conversion device 100B is changed from the operation by the three-phase conduction control to the operation by two-phase conduction control.

Figure 13:
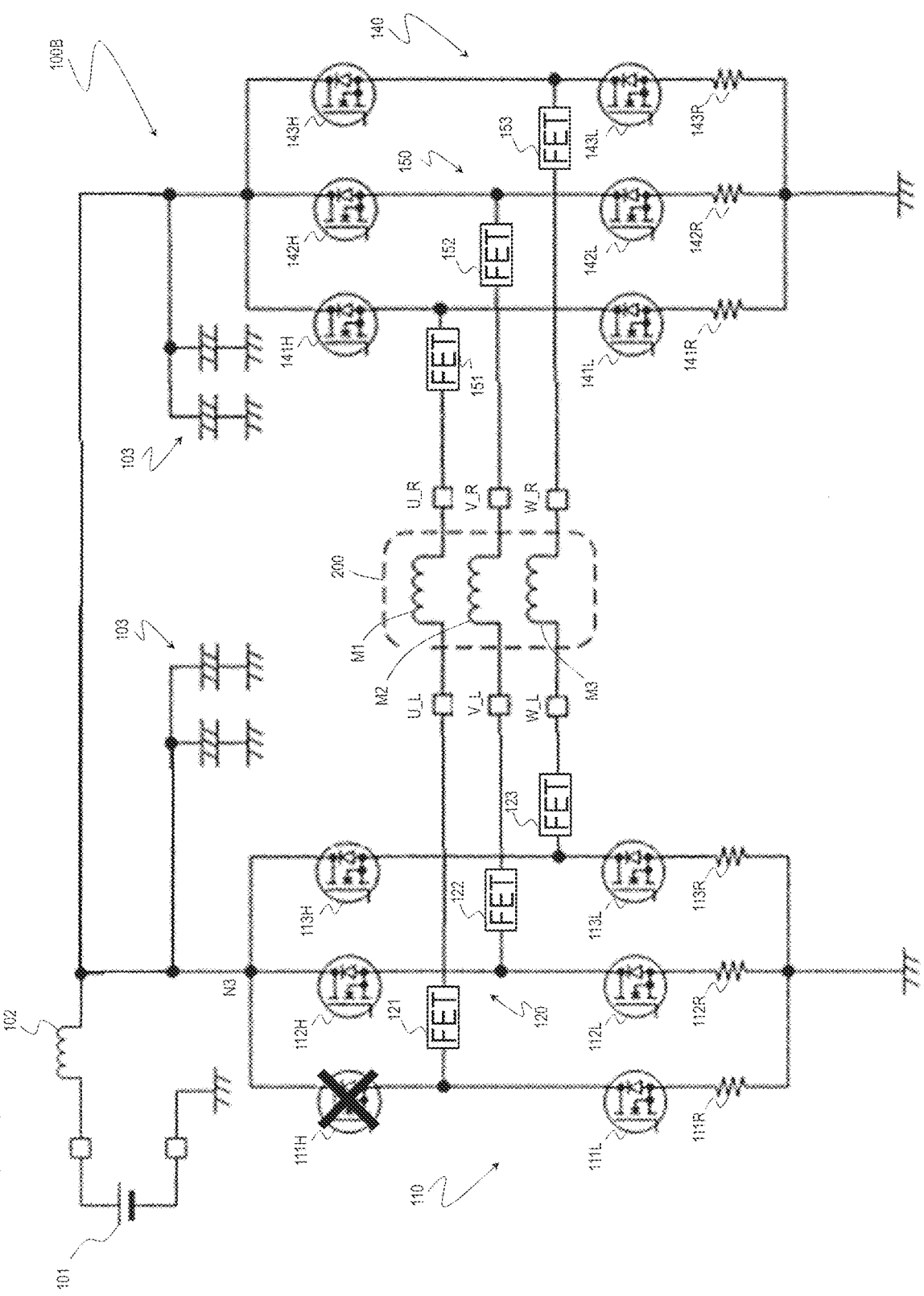
FIG. 13 is a diagram showing the power conversion device 100B of the illustrative second embodiment under abnormal conditions.
Figure 14:
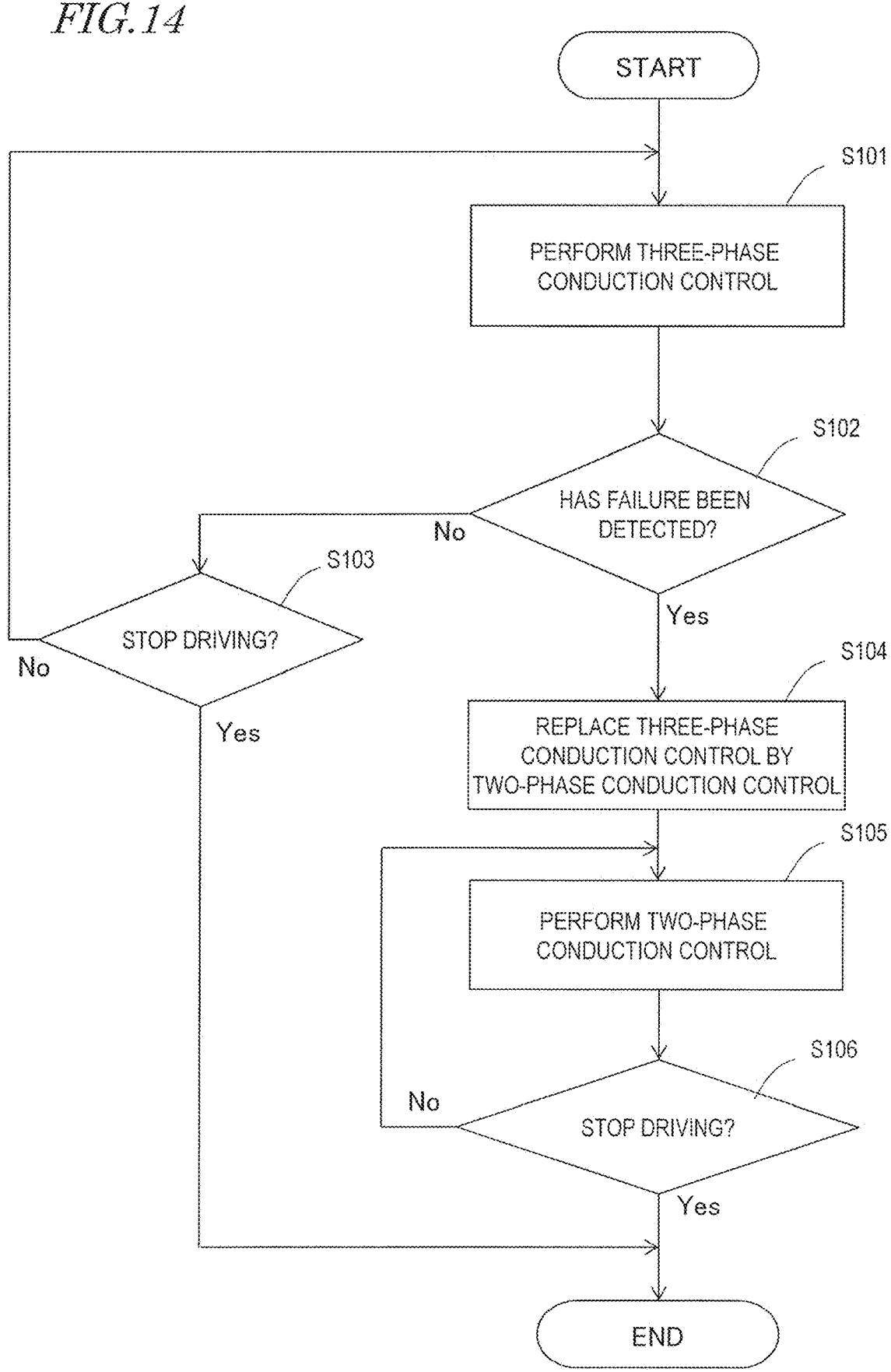
FIG. 14 is a flowchart showing an operation of the power conversion device 100B of the illustrative second embodiment.

A specific example operation under abnormal conditions of the power conversion device 100B will be described. FIG. 13 is a diagram showing a situation that a U-phase FET has failed in the power conversion device 100B. FIG. 14 is a flowchart showing an operation of the power conversion device 100B.

Under normal conditions, i.e., when a FET failure has not been detected, the control circuit 300 performs the three-phase conduction control on the first inverter 110 and the second inverter 140 (step S101). In the three-phase conduction control under normal conditions, the phase isolation relays 121, 122, 123, 151, 152, and 153 are on.

The drive circuit 350 monitors whether or not any FET has failed in the first inverter 110 or the second inverter 140 (step S102). If the drive circuit 350 has not detected a failure (NO in step S102) and has not received a command to stop driving the power conversion device 100B (NO in step S103), the control circuit 300 continues to perform the three-phase conduction control. During the continuation of the three-phase conduction control, if the detection circuit 350 has received a command to stop driving the power conversion device 100B (YES in step S103), the control circuit 300 stops driving the power conversion device 100B.

If the drive circuit 350 has detected a failure in a FET (YES in step S102), the control circuit 300 changes the control of the first inverter 110 and the second inverter 140 from the three-phase conduction control to two-phase conduction control (step S104). In this case, the two-phase conduction control is performed using two phases different from one of the three phases that corresponds to a winding coupled to the failed FET (step S105).

For example, as shown in FIG. 13, it is assumed that the FET 111H of the first inverter 110 has failed. The type of the failure of the FET 111H is either a short-circuit failure or an open-circuit failure. In this case, the control circuit 300 turns off the phase isolation relay 121 which switches between connection and disconnection of the winding M1 coupled to the failed FET 111H to and from the first inverter 110, of the three phase isolation relays 121, 122, and 123. The control circuit 300 turns on the remaining two phase isolation relays 122 and 123 different from the phase isolation relay 121 which is turned off. In addition, the control circuit 300 turns off the phase isolation relay 151 which switches between connection and disconnection of the winding M1 to and from the second inverter 140. The control circuit 300 turns on the remaining two phase isolation relays 152 and 153.

The control circuit 300 performs the two-phase conduction control using the other four legs 173, 174, 175, and 176 (FIGS. 11 and 12) different from the failed leg 171 (FIG. 10) including the failed FET 111H, and the leg 172 included in the H-bridge 181 formed by the failed leg 171 and the leg 172. In other words, the control circuit 300 performs the two-phase conduction control using the other two H-bridges 182 and 183 (V-phase and W-phase) different from the H-bridge 181 (U-phase) including the failed FET 111H.

If the control circuit 300 has not received a command to stop driving the power conversion device 100B (NO in step S106), the control circuit 300 continues to perform the two-phase conduction control. If the control circuit 300 has received a command to stop driving the power conversion device 100B (YES in step S106), the control circuit 300 stops driving the power conversion device 100B.

Figure 15:
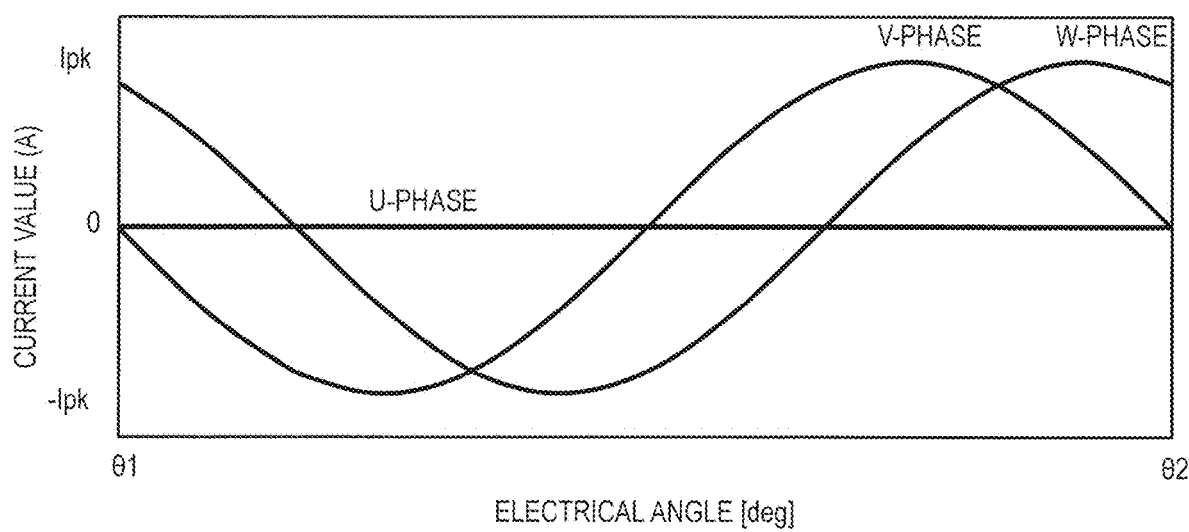
FIG. 15 is a diagram showing current waveforms that are obtained by plotting values of currents flowing through a U-phase, a V-phase, and a W-phase winding of a motor 200 in control under abnormal conditions according to the illustrative second embodiment.

FIG. 15 shows example current waveforms (sine waves) that are obtained by plotting values of currents flowing through the U-phase, V-phase, and W-phase windings of the motor 200 when the power conversion device 100B is controlled by the two-phase conduction control. In this example, the two-phase conduction control is performed using the V-phase and the W-phase and without using the U-phase. The horizontal axis represents motor electrical angles (deg), and the vertical axis represents current values (A). $I_{pk}$ represents the greatest current value (peak current value) of each phase. In the two-phase conduction control, the greatest current value and the difference in phase between currents flowing through the two phases are adjusted to change a torque, etc.

Note that, in the two-phase conduction control, the same power as that which is supplied in the three-phase conduction control may be supplied to the motor 200. This allows the motor 200 to generate a torque having a magnitude close to that which is generated in the three-phase conduction control.

In this example, the phase isolation relays 121 and 151 for the U-phase, which has the failed FET 111H, are turned off. As a result, even if a back electromotive force occurs in the U-phase, a current path in which a regenerative current would otherwise flow is open due to the off-state phase isolation relays 121 and 151, so that the occurrence of a regenerative torque is prevented, and the drive can be continued using the remaining two phases.

In the event of a failure in any of the other FETs 111L, 141H, and 141L different from the FET 111H in the H-bridge 181, the two-phase conduction control can be performed as in the above case.

Thus, when a failure has been detected in a FET included in the first inverter 110 or the second inverter 140, the control of the first inverter 110 and the second inverter 140 is changed from the three-phase conduction control to the two-phase conduction control. As a result, even in the event of a failure in a FET included in the first inverter 110 or the second inverter 140, the motor 200 can continue to be driven to rotate.

Figure 16:
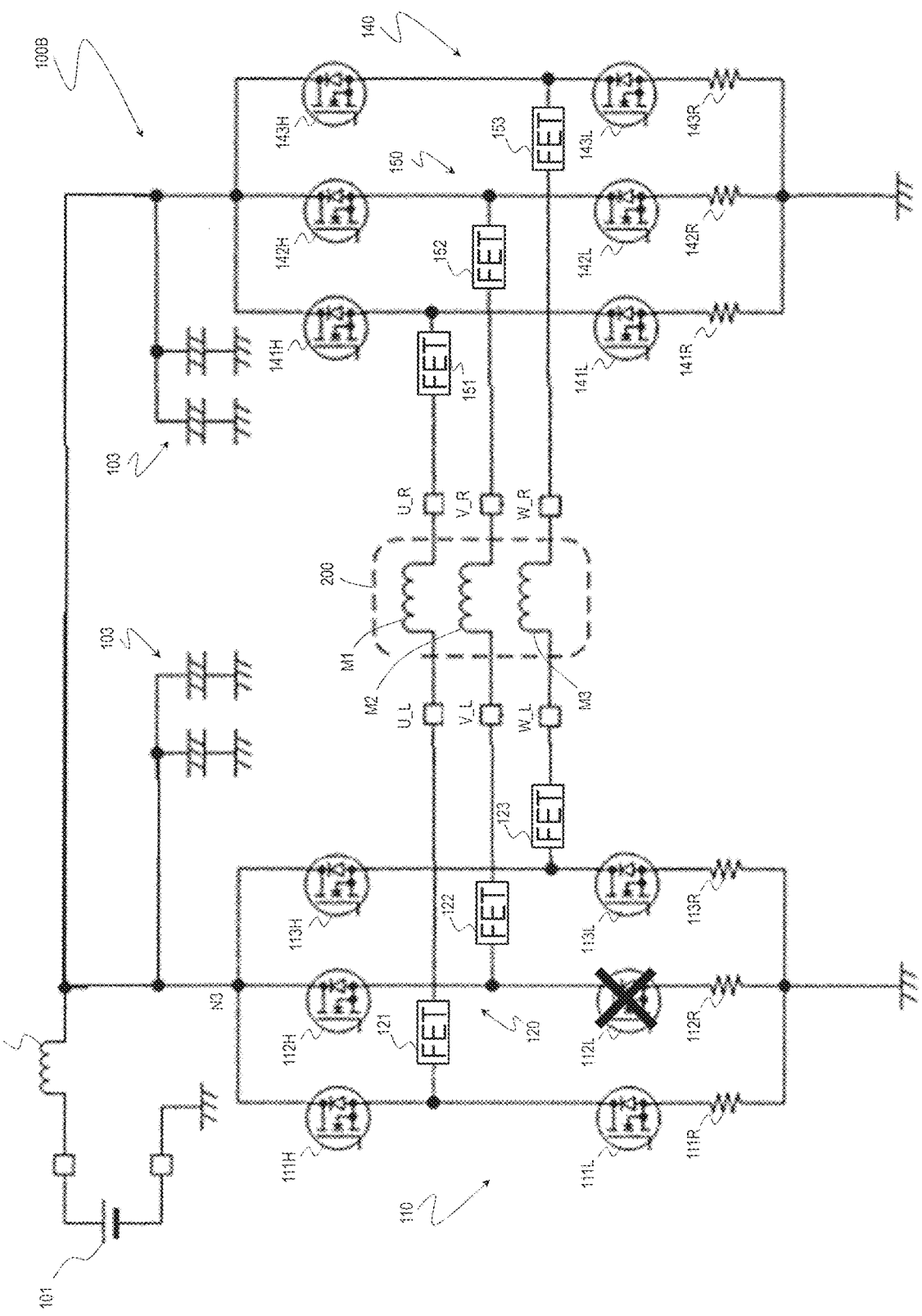
FIG. 16 is a schematic diagram showing the power conversion device 100B of the illustrative second embodiment under abnormal conditions.

FIG. 16 is a diagram showing a situation that a V-phase FET has failed in the power conversion device 100B. In this example, the FET 112L of the first inverter 110 has failed. The type of the failure of the FET 112L is either a short-circuit failure or an open-circuit failure. In this case, the control circuit 300 turns off the phase isolation relay 122 which switches between connection and disconnection of the winding M2 coupled to the failed FET 112L to and from the first inverter 110, of the three phase isolation relays 121, 122, and 123. The control circuit 300 turns on the remaining two phase isolation relays 121 and 123 different from the phase isolation relay 122 which is turned off. In addition, the control circuit 300 turns off the phase isolation relay 152 which switches between connection and disconnection of the winding M2 to and from the second inverter 140. The control circuit 300 turns on the remaining two phase isolation relays 151 and 153.

The control circuit 300 performs the two-phase conduction control using the other four legs 171, 172, 175, and 176 (FIGS. 10 and 12) different from the failed leg 173 (FIG. 11) including the failed FET 112L, and the leg 174 included in the H-bridge 182 formed by the failed leg 173 and the leg 174. In other words, the control circuit 300 performs the two-phase conduction control using the other two H-bridges 181 and 183 (U-phase and W-phase) different from the H-bridge 182 (V-phase) including the failed FET 112L.

Figure 17:
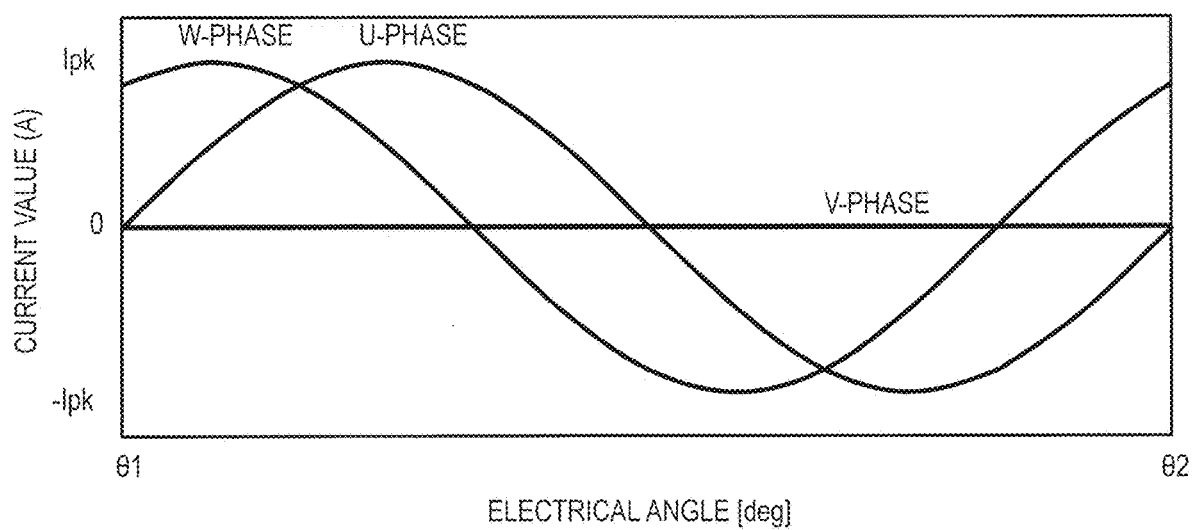
FIG. 17 is a diagram showing current waveforms that are obtained by plotting values of currents flowing through a U-phase, a V-phase, and a W-phase winding of a motor 200 in control under abnormal conditions according to the illustrative second embodiment.

FIG. 17 shows example current waveforms (sine waves) that are obtained by plotting values of currents flowing through the U-phase, V-phase, and W-phase windings of the motor 200 when the power conversion device 100B is controlled by the two-phase conduction control. In this example, the two-phase conduction control is performed using the U-phase and the W-phase and without using the V-phase. The horizontal axis represents motor electrical angles (deg), and the vertical axis represents current values (A). $I_{pk}$ represents the greatest current value (peak current value) of each phase.

Note that, in the two-phase conduction control, the same power as that which is supplied in the three-phase conduction control may be supplied to the motor 200. This allows the motor 200 to generate a torque having a magnitude close to that which is generated in the three-phase conduction control.

In this example, the phase isolation relays 122 and 152 for the V-phase, which has the failed FET 112L, are turned off. As a result, even if a back electromotive force occurs in the V-phase, a current path in which a regenerative current would otherwise flow is open due to the off-state phase isolation relays 122 and 152, so that the occurrence of a regenerative torque is prevented, and the drive can be continued using the remaining two phases.

In the event of a failure in any of the other FETs 112H, 142H, and 142L different from the FET 112L in the H-bridge 182, the two-phase conduction control can be performed as in the above case.

Figure 18:
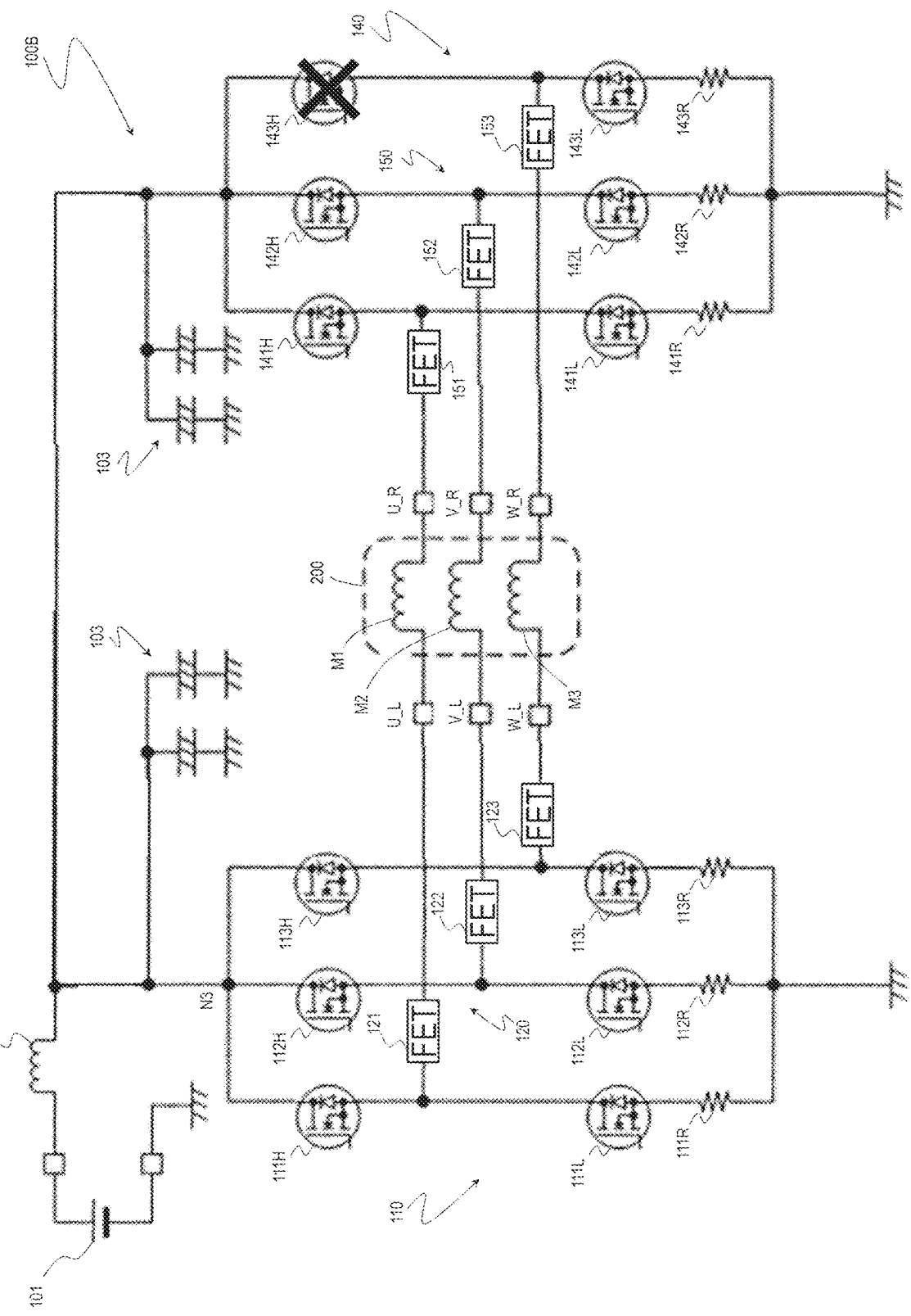
FIG. 18 is a schematic diagram showing the power conversion device 100B of the illustrative second embodiment under abnormal conditions.

FIG. 18 is a diagram showing a situation that a W-phase FET has failed in the power conversion device 100B. In this example, the FET 143H of the second inverter 140 has failed. The type of the failure of the FET 143H is either a short-circuit failure or an open-circuit failure. In this case, the control circuit 300 turns off the phase isolation relay 153 which switches between connection and disconnection of the winding M3 coupled to the failed FET 143H to and from the second inverter 140, of the three phase isolation relays

151, 152, and 153. The control circuit 300 turns on the remaining two phase isolation relays 151 and 152 different from the phase isolation relay 153 which is turned off. In addition, the control circuit 300 turns off the phase isolation relay 123 which switches between connection and disconnection of the winding M3 to and from the first inverter 110. The control circuit 300 turns on the remaining two phase isolation relays 121 and 122.

The control circuit 300 performs the two-phase conduction control using the other four legs 171, 172, 173, and 174 (FIGS. 10 and 11) different from the failed leg 176 (FIG. 12) including the failed FET 143H, and the leg 175 included in the H-bridge 183 formed by the failed leg 176 and the leg 175. In other words, the control circuit 300 performs the two-phase conduction control using the other two H-bridges 181 and 182 (U-phase and V-phase) different from the H-bridge 183 (W-phase) including the failed FET 143H.

Figure 19:
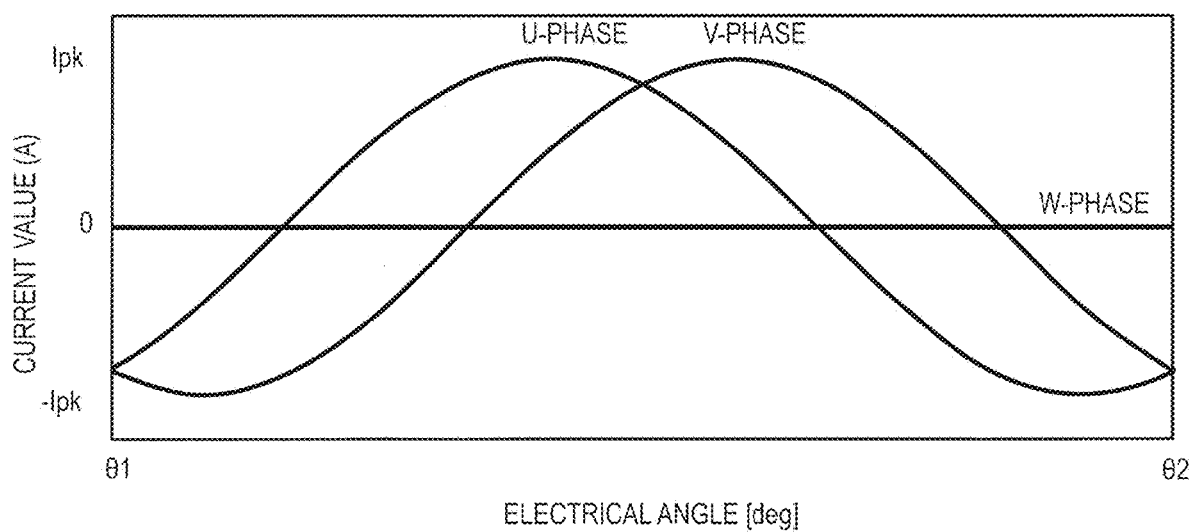
FIG. 19 is a diagram showing current waveforms that are obtained by plotting values of currents flowing through a U-phase, a V-phase, and a W-phase winding of a motor 200 in control under abnormal conditions according to the illustrative second embodiment.

FIG. 19 shows example current waveforms (sine waves) that are obtained by plotting values of currents flowing through the U-phase, V-phase, and W-phase windings of the motor 200 when the power conversion device 100B is controlled by the two-phase conduction control. In this example, the two-phase conduction control is performed using the U-phase and the V-phase and without using the W-phase. The horizontal axis represents motor electrical angles (deg), and the vertical axis represents current values (A). $I_{pk}$ represents the greatest current value (peak current value) of each phase.

Note that, in the two-phase conduction control, the same power as that which is supplied in the three-phase conduction control may be supplied to the motor 200. This allows the motor 200 to generate a torque having a magnitude close to that which is generated in the three-phase conduction control.

In this example, the phase isolation relays 123 and 153 for the W-phase, which has the failed FET 143H, are turned off. As a result, even if a back electromotive force occurs in the W-phase, a current path in which a regenerative current would otherwise flow is open due to the off-state phase isolation relays 123 and 153, so that the occurrence of a regenerative torque is prevented, and the drive can be continued using the remaining two phases.

In the event of a failure in any of the other FETs 113H, 113L, and 143L different from the FET 143H in the H-bridge 183, the two-phase conduction control can be performed as in the above case.

Figure 20:
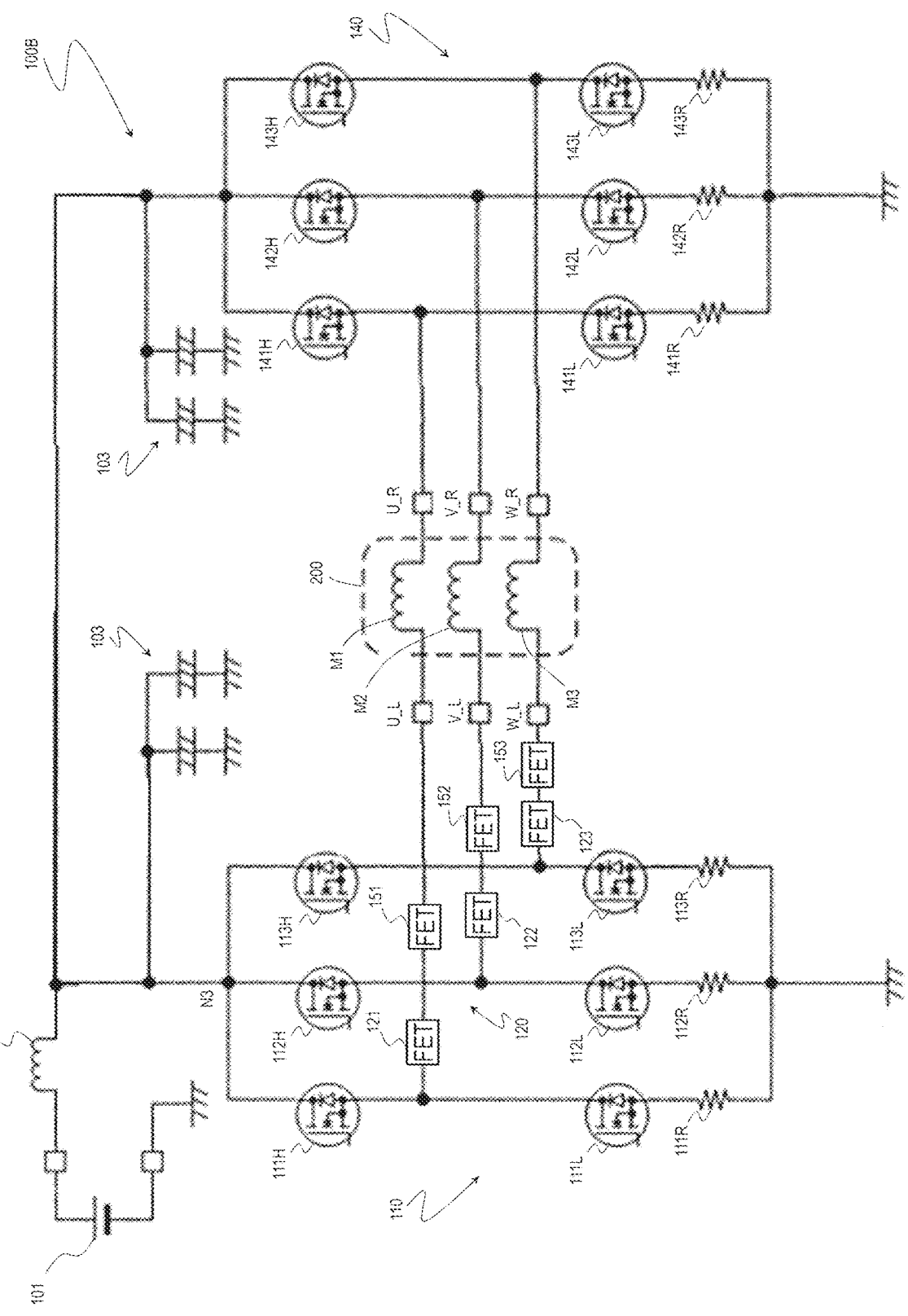
FIG. 20 is a circuit diagram showing another circuit configuration of the power conversion device 100B of the illustrative second embodiment.

Note that the phase isolation relays 151, 152, and 153 may be provided for the first inverter 110. FIG. 20 shows a variation of the circuit configuration of the power conversion device 100B. In this example, the phase isolation relays 121, 122, 123, 151, 152, and 153 connect and disconnect one end of each of the windings M1, M2, and M3 of the motor 200 to and from the first inverter 110.

In the embodiment described above, a three-phase motor has been illustrated as the motor 200. Alternatively, the motor 200 may be a motor having more than three phases. The motor 200 may be an n-phase motor having n phase windings (n is an integer of three or more), such as a four-phase motor, five-phase motor, or six-phase motor. The power conversion device 100B is provided with at least n phase isolation relays which switch between connection and disconnection of one end of each of the n phase windings of the motor 200 to and from the first inverter 110.

In the foregoing, when a failure has been detected in a FET, the three-phase conduction control is replaced by the two-phase conduction control. The number of phases that are driven in the event of a failure is not limited to the number of phases that is one less than under normal conditions. For example, in the case where the motor 200 is a five-phase motor, five-phase conduction control may be replaced by the two-phase conduction control or three-phase conduction control.

Similarly, in the case where the motor 200 is a four-phase motor, when a failure has been detected in a FET, four-phase conduction control may be replaced by either the three-phase conduction control or two-phase conduction control.

Similarly, in the case where the motor 200 is a six-phase motor, when a failure has been detected in a FET, six-phase conduction control may be replaced by any of the five-phase conduction control, four-phase conduction control, three-phase conduction control, and two-phase conduction control.

Thus, when a failure has been detected in a FET, n-phase conduction control is replaced by m-phase conduction control. Here, m is an integer of not smaller than two and smaller than n. When a failure has been detected in a FET, the motor 200 may be driven to rotate using a minimum number of phases that allows the motor 200 to be driven to rotate. For example, a brushless motor can be driven using two or more phases. By suitably setting the number of phases that are used in the event of a failure, an optimum motor output can be selected, and an additional failure can be prevented or reduced in the motor 200.

Third Embodiment

Vehicles such as automobiles are typically equipped with an electric power steering device. The electric power steering device generates an assistive torque that is added to the steering torque of a steering system that is generated by a driver turning a steering wheel. The assistive torque is generated by an assistive torque mechanism, and can reduce a driver's burden of turning a steering wheel. For example, the assistive torque mechanism includes a steering torque sensor, an ECU, a motor, and a deceleration mechanism, etc. The steering torque sensor detects a steering torque in the steering system. The ECU generates a drive signal on the basis of a detection signal from the steering torque sensor. The motor generates an assistive torque depending on the steering torque on the basis of the motor drive signal. The assistive torque is transferred through the deceleration mechanism to the steering system.

Figure 21:
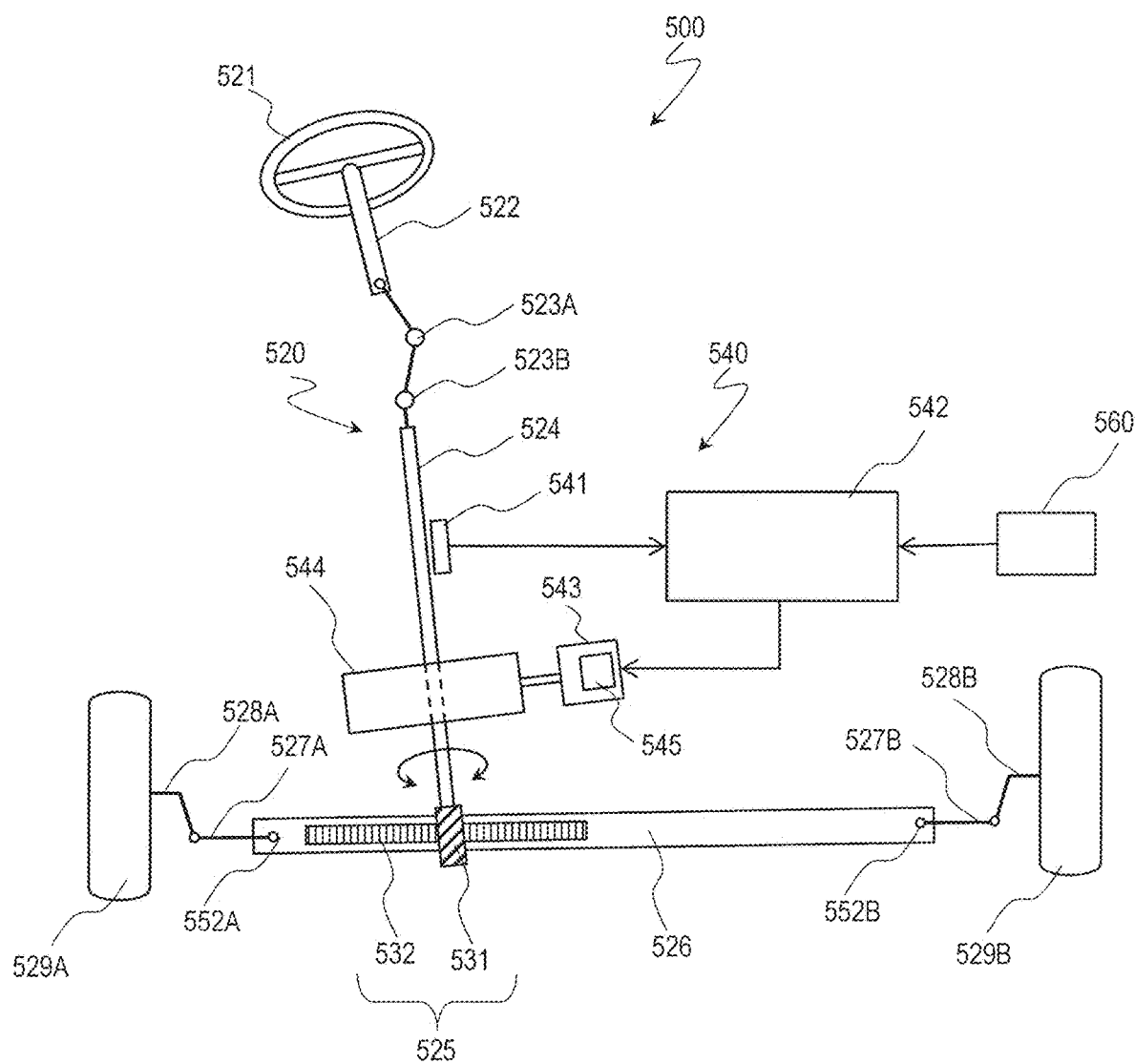
FIG. 21 is a schematic diagram showing a typical configuration of an electric power steering device 500 according to an illustrative third embodiment.

The motor drive unit 400 of the present disclosure may be used in the electric power steering device. FIG. 21 schematically shows a typical configuration of an electric power steering device 500 according to this embodiment. The electric power steering device 500 includes a steering system 520 and an assistive torque mechanism 540.

The steering system 520 includes, for example, a steering wheel 521, a steering shaft 522 (also called a "steering column"), universal couplings 523A and 523B, a rotating shaft 524 (also called a "pinion shaft" or "input shaft"), a rack and pinion mechanism 525, a rack shaft 526, left and right ball joints 552A and 552B, tie rods 527A and 527B, knuckles 528A and 528B, and left and right steerable wheels (e.g., left and right front wheels) 529A and 529B. The steering wheel 521 is linked through the steering shaft 522 and the universal couplings 523A and 523B to the rotating shaft 524. The rotating shaft 524 is linked through the rack and pinion mechanism 525 to the rack shaft 526. The rack and pinion mechanism 525 has a pinion 531 provided on the rotating shaft 524, and a rack 532 provided on the rack shaft 526. A right end of the rack shaft 526 is linked to the right steerable wheel 529A through the ball joint 552A, the tie rod 527A, and the knuckle 528A in this order with the ball joint 552A being closest to the right end of the rack shaft 526. As with the right side, a left end of the rack shaft 526 is linked to the left steerable wheel 529B through the ball joint 552B, the tie rod 527B, and the knuckle 528B in this order with the ball joint 552B being closest to the left end of the rack shaft 526. Here, the right and left sides correspond to the right and left sides, respectively, of a driver sitting on a seat.

In the steering system 520, a steering torque is generated by a driver turning the steering wheel 521, and is transmitted through the rack and pinion mechanism 525 to the left and right steerable wheels 529A and 529B. As a result, the driver can control the left and right steerable wheels 529A and 529B.

The assistive torque mechanism 540 includes, for example, a steering torque sensor 541, an ECU 542, a motor 543, a deceleration mechanism 544, and a power conversion device 545. The assistive torque mechanism 540 applies an assistive torque to the steering system 520 including from the steering wheel 521 to the left and right steerable wheels 529A and 529B. Note that the assistive torque may also be called an "additional torque."

As the ECU 542, the control circuits 300 of the first and second embodiments can be used. As the power conversion device 545, the power conversion devices 100, 100A, and 100B of the first and second embodiments can be used. The motor 543 is equivalent to the motor 200 of the first and second embodiments. As a mechanically and electronically integrated unit including the ECU 542, the motor 543, and the power conversion device 545, the motor drive units 400 of the first and second embodiments may be used.

The steering torque sensor 541 detects a steering torque that is applied to the steering system 520 using the steering wheel 521. The ECU 542 generates a drive signal for driving the motor 543 on the basis of a detection signal (hereinafter referred to as a "torque signal") from the steering torque sensor 541. The motor 543 generates an assistive torque depending on the steering torque on the basis of the drive signal. The assistive torque is transmitted through the deceleration mechanism 544 to the rotating shaft 524 of the steering system 520. The deceleration mechanism 544 is, for example, a worm gear mechanism. The assistive torque is further transmitted from the rotating shaft 524 to the rack and pinion mechanism 525.

The electric power steering device 500 may be categorized into the pinion assist type, rack assist type, column assist type, etc., according to a portion of the steering system 520 to which the assistive torque is added. FIG. 21 shows the electric power steering device 500 of the pinion assist type. Note that the electric power steering device 500 may be of the rack assist type, column assist type, etc.

In addition to the torque signal, a vehicle speed signal may be input to the ECU 542, for example. A piece of external equipment 560 may, for example, be a vehicle speed sensor. Alternatively, the external equipment 560 may, for example, be another ECU that can communicate with the ECU 542 over an in-vehicle network, such as a controller area network (CAN). The microcontroller of the ECU 542 can perform vector control or PWM control on the motor 543 on the basis of the torque signal and the vehicle speed signal, etc.

The ECU 542 determines a desired current value on the basis of at least the torque signal. The ECU 542 may determine the desired current value, taking into account the vehicle speed signal detected by the vehicle speed sensor, and in addition, a rotor rotation signal detected by an angle sensor. The ECU 542 can control a drive signal, i.e. a drive current, for the motor 543 such that an actual current value detected by a current sensor (not shown) is equal to the desired current value.

The electric power steering device 500 can control the left and right steerable wheels 529A and 529B through the rack shaft 526 using a composite torque obtained by adding the assistive torque of the motor 543 to a driver's steering torque. In particular, if the motor drive unit 400 of the present disclosure is applied to the above mechanically and electronically integrated unit, an electric power steering device including a motor drive unit is provided in which the quality of parts can be improved, and suitable current control can be performed under both normal and abnormal conditions.

Fourth Embodiment

Figure 22:
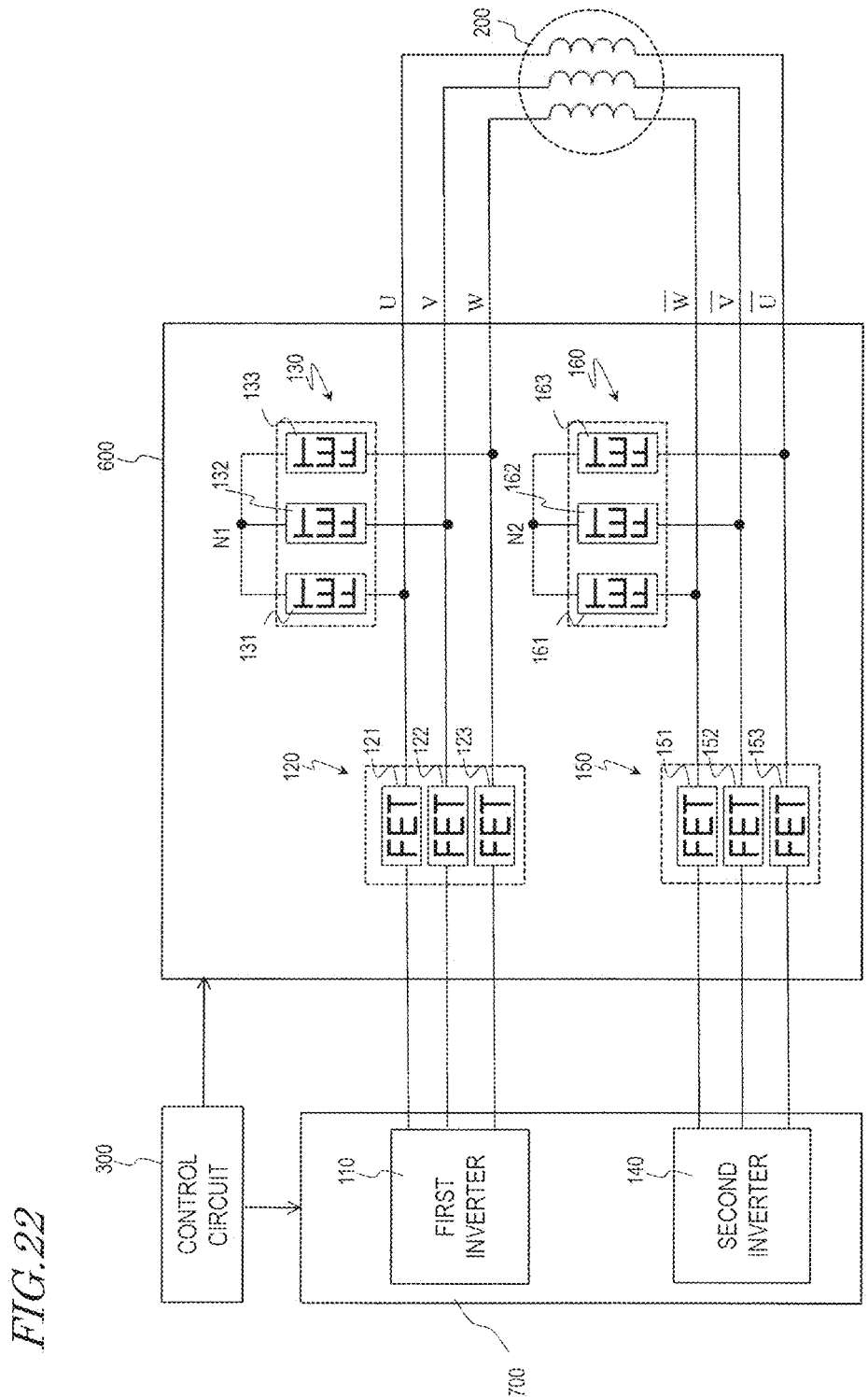
FIG. 22 is a circuit diagram showing a circuit configuration of a relay module 600 according to an illustrative fourth embodiment.

FIG. 22 schematically shows a circuit configuration of a relay module 600 according to this embodiment.

The relay module 600 includes a first phase isolation relay circuit 120, a first neutral point relay circuit 130, a second phase isolation relay circuit 150, and a second neutral point relay circuit 160. The relay module 600 can be coupled to a power conversion device 700 that drives a motor 200 having three phase (U-phase, V-phase, and W-phase) windings. The power conversion device 700 includes a first inverter 110 and a second inverter 140. The first inverter 110 is coupled to one end of each phase winding, and the second inverter 140 is coupled to the other end of each phase winding.

The relay module 600 is electrically connected between the motor 200 and the power conversion device 700. The first phase isolation relay circuit 120, the first neutral point relay circuit 130, the second phase isolation relay circuit 150, and the second neutral point relay circuit 160 each have a circuit structure as described in the first embodiment. Specifically, the first phase isolation relay circuit 120 includes three FETs 121, 122, and 123 that are each coupled to one end of the respective corresponding phase winding, and the first inverter 110. The second phase isolation relay circuit 150 includes three FETs 151, 152, and 153 that are each coupled to the other end of the respective corresponding phase winding, and the second inverter 140. The first neutral point relay circuit 130 includes three FETs 131, 132, and 133 one end of each of which is coupled to a common first node N1 and other end of each of which is coupled to one end of the respective corresponding phase winding. The second neutral point relay circuit 160 includes three FETs 161, 162, and 163 one end of each of which is coupled to a common second node N2 and the other end of each of which is coupled to the other end of the respective corresponding phase winding.

The first phase isolation relay circuit 120 switches between connection and disconnection of one end of each phase winding to and from the first inverter 110. The second phase isolation relay circuit 150 switches between connection and disconnection of the other end of each phase winding to and from the second inverter 140. The first neutral point relay circuit 130 switches between connection and disconnection of one end of each of the phase windings to and from the one end of each other phase winding. The second neutral point relay circuit 160 switches between connection and disconnection of the other end of each of the phase windings to and from the other end of each other phase winding.

In the relay module 600, when the first phase isolation relay circuit 120 is turned on, the first neutral point relay circuit 130 is turned off, and when the first phase isolation relay circuit 120 is turned off, the first neutral point relay circuit 130 is turned on. When the second phase isolation relay circuit 150 is turned on, the second neutral point relay circuit 160 is turned off, and when the second phase isolation relay circuit 150 is turned off, the second neutral point relay circuit 160 is turned on. The relay module 600, specifically each relay circuit, may be controlled by, for example, an external control circuit or a dedicated driver. The external control circuit is, for example, the control circuit 300 of the first embodiment. In this embodiment, the relay module 600 is controlled by the control circuit 300.

Under normal conditions, the control circuit 300 turns on the first phase isolation relay circuit 120 and turns off the first neutral point relay circuit 130, and turns on the second phase isolation relay circuit 150 and turns off the second neutral point relay circuit 160. Note that the on/off-state of each relay circuit, and an electrical connection relationship between the first and second inverters 110 and 140 and the motor 200 in the on/off-states, are as described in the first embodiment. For example, the control circuit 300 can drive the motor by controlling the switching operations of the FETs of the two inverters by PWM control such that the current waveforms of FIG. 5 are obtained.

It is assumed that the first inverter 110 has failed. Under such abnormal conditions, as in the first embodiment, the control circuit 300 turns off the first phase isolation relay circuit 120 and turns on the first neutral point relay circuit 130, and turns on the second phase isolation relay circuit 150 and turns off the second neutral point relay circuit 160. In this state, one end of each of the phase windings of the motor 200 is connected together to form a neutral point for the phase windings in the relay module 600 (specifically, the first neutral point relay circuit 130). The control circuit 300 can control the second inverter 140 to drive the motor 200 with a neutral point being formed. The control circuit 300 controls the switching operations of the FETs of the second inverter 140 by PWM control such that, for example, current waveforms shown in FIG. 7 are obtained. Thus, the relay module 600 can be used to form a closed loop of a drive current, and therefore, suitable current control can be performed even under abnormal conditions.

A variation of the circuit configuration of the relay module 600 will be described with reference to FIG. 23.

In this embodiment, the relay module 600 includes two phase isolation relay circuits and two neutral point relay circuits. However, the present disclosure is not limited to this. For example, a relay module 600 may include a first phase isolation relay circuit 120 and a first neutral point relay circuit 130 (a single pair of relay circuits). In other words, a relay module 600 may optionally have a configuration in which a single pair of relay circuits is provided for one of the inverters of the power conversion device 100.

Figure 23:
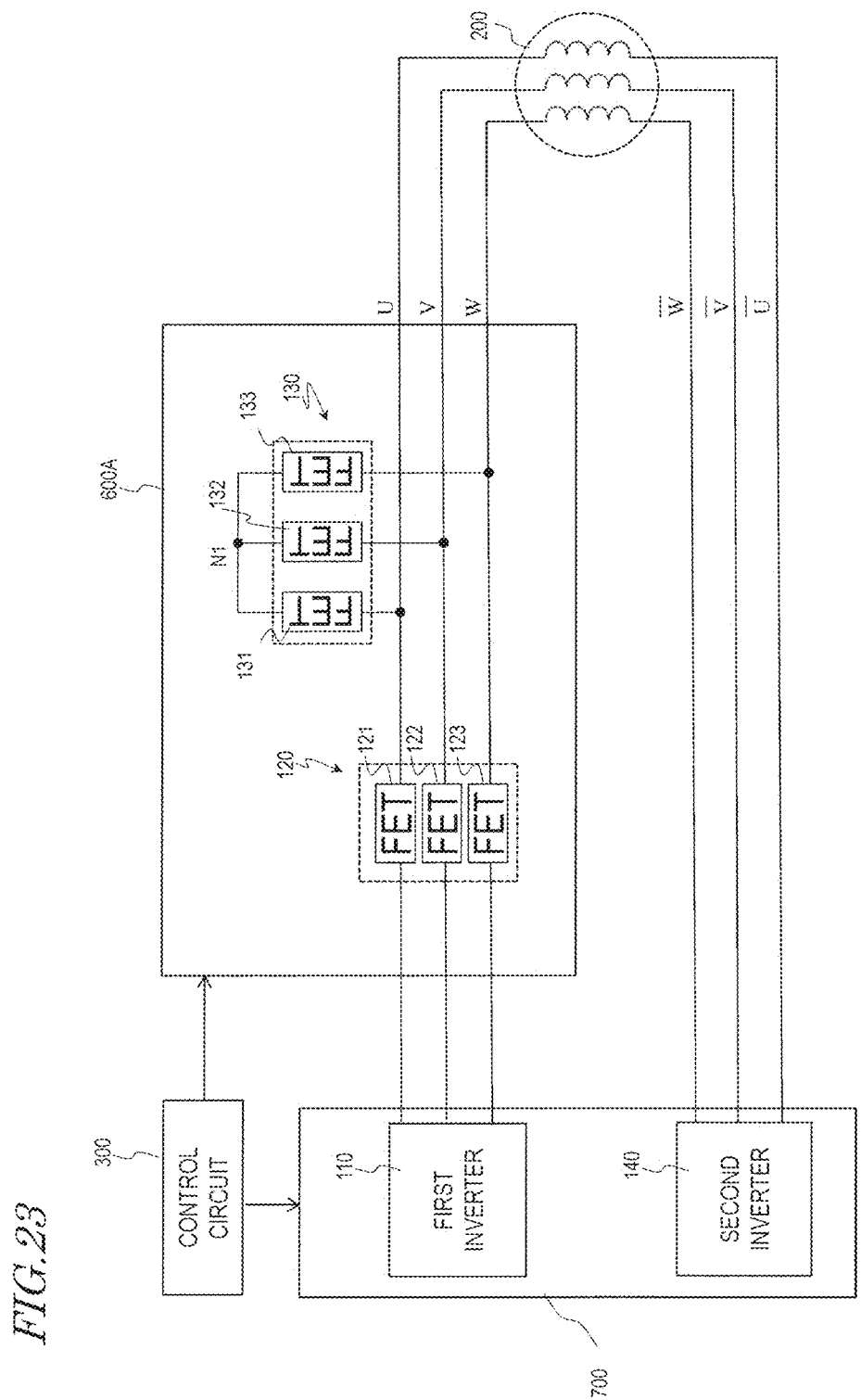
FIG. 23 is a circuit diagram showing a circuit configuration of a relay module 600A including a single pair of relay circuits.

FIG. 23 shows a circuit configuration of a relay module 600A including a single pair of relay circuits. The relay module 600A is coupled between one of a first and a second inverter 110 and 140 and a motor 200. In the example shown in FIG. 23, the pair of relay circuits (i.e., a first phase isolation relay circuit 120 and a first neutral point relay circuit 130) is coupled to the first inverter 110.

It is assumed that the inverter coupled to the pair of relay circuits, i.e., the first inverter, has failed. In this case, the control circuit 300 turns off the first phase isolation relay circuit 120 and turns on the first neutral point relay circuit 130. The control circuit 300 can control the second inverter 140 to drive the motor 200 with a neutral point being formed. This circuit configuration allows the failed inverter to be disconnected from the motor 200, and the first node N1 to function as a neutral point.

In this embodiment, in the control of the power conversion device 700 under abnormal conditions, a power loss can be prevented or reduced, and suitable current control can be performed by forming a closed loop of a drive current.

INDUSTRIAL APPLICABILITY

The embodiments of the present disclosure are applicable to a wide variety of devices including various motors, such as vacuum cleaners, dryers, ceiling fans, washing machines, refrigerators, and electric power steering devices.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A power conversion device for converting power from a power source into power that is to be supplied to a motor having n phase windings, n being an integer of three or more, the device comprising:
   a first inverter to which a first end of each phase winding of the motor is coupled;
   a second inverter to which the second end of each phase winding is coupled; and
   at least n relays structured to switch between connection and disconnection of the first end of each of the n phase windings to and from the first inverter, wherein
   the first and second inverters being structured to, when operating normally, convert power from the power supply into power that is to be supplied to the motor by n-phase conduction control;
   the power conversion device is structured such that, under a failure in at least one of a plurality of switching elements included in the first and second inverters, the first and second inverters convert power from the power supply into power that is to be supplied to the motor by m-phase conduction control using m phases of the n phases different from the phase of a winding coupled to the failed switching element, m being an integer of not smaller than two and smaller than n;
   each of the first and second inverters comprise n legs each comprising a low-side switching element and a high-side switching element; and
   the plurality of switching elements of the first and second inverters form a plurality of H-bridges,
   wherein
   the at least n relays are coupled between the first end of each of the n phase windings and the n legs of the first invertor forming the H-bridges, and the second end of each of the n phase windings are coupled to the n legs of the second inverter forming the H-bridges,
   the power conversion device further comprises circuit structured to perform n-phase conduction control on the first and second inverters,
   the power conversion device is structured such that, under a failure in at least one of a plurality of switching elements included in the first and second inverters, the control circuit changes the control of the first and second inverters from the n-phase conduction control to the m-phase conduction control, and the power conversion device further comprises n relays each of which is structured to switch between connection and disconnection of the second end of the corresponding one of the n phase windings to and from the second inverter.

2. The power conversion device of claim 1, wherein the power conversion device is structured such that, under a failure in at least one of a plurality of switching elements included in the first and second inverters, one of the at least n relays that switches between connection and disconnection of one of the n phase windings coupled to the failed switching element to and from the first inverter, is turned off, and at least m of the at least n relays different from the relay turned off are turned on.

3. The power conversion device of claim 1, wherein the power conversion device is structured such that, under a failure in a switching element included in the first inverter, power from the power supply is converted into power that is to be supplied to the motor, using 2m legs different from a failed leg including the failed switching element and a leg of the second inverter included in an H-bridge formed by the failed leg and the leg of the second inverter.

4. The power conversion device of claim 1, wherein the motor comprises three phase windings, the first and second inverters being structured to, when operating normally, convert power from the power supply into power that is to be supplied to the motor, by three-phase conduction control, and the power conversion device is structured such that, under a failure in at least one of a plurality of switching elements included in the first and second inverters, the first and second inverters convert power from the power supply into power that is to be supplied to the motor, by two-phase conduction control using the other two of the three phases different from the phase of a winding coupled to the failed switching element.

5. A motor drive unit comprising:

the electric motor;

the power conversion device of claim 1.

6. An electric power steering device comprising:

the motor drive unit of claim 5.

* * * * *